US012433429B2

(12) United States Patent
Johnston et al.

(10) Patent No.: US 12,433,429 B2
(45) Date of Patent: Oct. 7, 2025

(54) QUICK RELEASE SENSOR FOR MERCHANDISE DISPLAY

(71) Applicant: InVue Security Products Inc., Charlotte, NC (US)

(72) Inventors: Michael R. Johnston, Waxhaw, NC (US); Robert Schultz, Franklin, TN (US); David N. Berglund, Indian Trail, NC (US); Robert O. Hartweg, Waxhaw, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

(21) Appl. No.: 18/222,097

(22) Filed: Jul. 14, 2023

(65) Prior Publication Data
US 2023/0355009 A1 Nov. 9, 2023

Related U.S. Application Data

(63) Continuation of application No. 17/681,083, filed on Feb. 25, 2022, now Pat. No. 11,737,582, which is a
(Continued)

(51) Int. Cl.
*A47F 3/00* (2006.01)
*A47F 7/00* (2006.01)
(Continued)

(52) U.S. Cl.
CPC .............. *A47F 3/002* (2013.01); *A47F 3/004* (2013.01); *A47F 7/00* (2013.01); *A47F 7/024* (2013.01); *G08B 13/1463* (2013.01)

(58) Field of Classification Search
None
See application file for complete search history.

(56) References Cited

U.S. PATENT DOCUMENTS 6,039,498 A 3/2000 Leyden et al.
6,578,394 B2 6/2003 Yin
(Continued)

FOREIGN PATENT DOCUMENTS

DE 202009013722 U1 1/2011
EP 1441169 A2 7/2004
WO 2014004826 A1 1/2014

OTHER PUBLICATIONS

"Notification of Transmittal of International Search Report and Written Opinion of the International Searching Authority, or the Declaration" in International Patent Application No. PCT/US2014/059415, dated Jan. 8, 2015, 7 pages, United States Patent Office, Alexandria, Virginia.
(Continued)

*Primary Examiner* — Steven M Marsh
(74) *Attorney, Agent, or Firm* — InVue Security Products Inc.

(57) ABSTRACT

A sensor for a merchandise display security system for displaying and protecting an article of merchandise is provided. The security system includes a merchandise bracket configured to be secured to the article of merchandise and a sensor configured to releasably engage the merchandise bracket and to detect unauthorized removal of the merchandise bracket or the sensor from the article of merchandise. The sensor is configured to be releasably engaged with the merchandise bracket such that the sensor is removable from the merchandise bracket while the merchandise bracket remains secured to the article of merchandise.

20 Claims, 19 Drawing Sheets

Related U.S. Application Data continuation of application No. 17/175,207, filed on Feb. 12, 2021, now Pat. No. 11,259,653, which is a continuation of application No. 16/780,339, filed on Feb. 3, 2020, now Pat. No. 10,918,224, which is a continuation of application No. 16/169,597, filed on Oct. 24, 2018, now abandoned, which is a continuation of application No. 15/024,152, filed as application No. PCT/US2014/059415 on Oct. 7, 2014, now Pat. No. 10,111,537.

(60) Provisional application No. 61/895,722, filed on Oct. 25, 2013, provisional application No. 61/888,157, filed on Oct. 8, 2013.

(51) Int. Cl.
*A47F 7/024* (2006.01)
*G08B 13/14* (2006.01)

(56) References Cited

U.S. PATENT DOCUMENTS

| | | |
|---|---|---|
| 6,659,382 B2 | 12/2003 | Ryczek |
| 7,048,246 B2 | 5/2006 | Leyden et al. |
| 7,387,003 B2 | 6/2008 | Marszalek et al. |
| 7,593,142 B2 | 9/2009 | Marszalek et al. |
| 7,710,266 B2 | 5/2010 | Belden, Jr. et al. |
| 7,714,722 B2 | 5/2010 | Marszalek et al. |
| 7,922,137 B2 | 4/2011 | Derry et al. |
| 8,191,851 B2 | 6/2012 | Crown |
| 8,360,373 B2 | 1/2013 | Johnson et al. |
| 8,395,907 B2 | 3/2013 | Marszalek et al. |
| 8,413,943 B1 | 4/2013 | Li |
| 8,564,438 B2 | 10/2013 | Fawcett et al. |
| 8,599,022 B2 | 12/2013 | Conti et al. |
| 8,698,618 B2 | 4/2014 | Henson et al. |
| 8,814,128 B2 | 8/2014 | Trinh et al. |
| 8,955,807 B2 | 2/2015 | Alexander et al. |
| 9,105,166 B1 | 8/2015 | Kelsch et al. |
| 9,111,428 B2 | 8/2015 | Fawcett et al. |
| 9,125,501 B2 | 9/2015 | Reynolds et al. |
| 9,353,552 B1 | 5/2016 | Kelsch et al. |
| 9,524,626 B2 | 12/2016 | Bruhwiler et al. |
| 9,567,776 B2 | 2/2017 | Moock et al. |
| 9,786,140 B2 | 10/2017 | Henson et al. |
| 10,111,537 B2 | 10/2018 | Johnston et al. |
| 10,206,522 B2 | 2/2019 | Yang et al. |
| 10,373,456 B2 | 8/2019 | Henson et al. |
| 10,827,854 B2 * | 11/2020 | Grant .................. A47F 7/024 |
| 10,918,224 B2 | 2/2021 | Johnston et al. |
| 11,236,528 B2 * | 2/2022 | Berglund ............ E05B 73/0017 |
| 11,259,653 B2 | 3/2022 | Johnston et al. |
| 11,737,582 B2 | 8/2023 | Johnston et al. |
| 2003/0106971 A1 | 6/2003 | Leyden et al. |
| 2004/0048507 A1 | 3/2004 | Hage |
| 2008/0142665 A1 | 6/2008 | Belden et al. |
| 2009/0051535 A1 | 2/2009 | Brenner |
| 2009/0058643 A1 | 3/2009 | Groth |
| 2009/0079566 A1 | 3/2009 | Goldstein et al. |
| 2010/0176945 A1 | 7/2010 | Fawcett et al. |
| 2011/0068919 A1 | 3/2011 | Rapp et al. |
| 2011/0068920 A1 | 3/2011 | Yeager et al. |
| 2011/0187531 A1 | 8/2011 | Oehl et al. |
| 2012/0192600 A1 | 8/2012 | Johnston et al. |
| 2012/0205326 A1 | 8/2012 | Richter et al. |
| 2012/0217371 A1 | 8/2012 | Abdollahzadeh et al. |
| 2012/0280810 A1 | 11/2012 | Wheeler |
| 2013/0026322 A1 | 1/2013 | Wheeler et al. |
| 2013/0063266 A1 | 3/2013 | Yunker et al. |
| 2013/0134287 A1 | 5/2013 | Gresset |
| 2013/0168527 A1 | 7/2013 | Wheeler et al. |
| 2014/0059828 A1 | 3/2014 | Reynolds et al. |
| 2014/0260443 A1 | 9/2014 | Grziwok et al. |
| 2014/0340225 A1 | 11/2014 | Grant et al. |
| 2014/0346311 A1 | 11/2014 | Derman |
| 2014/0362517 A1 | 12/2014 | Moock et al. |
| 2015/0091729 A1 | 4/2015 | Philips et al. |
| 2015/0208826 A1 * | 7/2015 | Yang ...................... E05B 73/00 248/316.1 |
| 2015/0235533 A1 * | 8/2015 | Grant ................. G08B 13/1445 340/568.2 |
| 2016/0235217 A1 | 8/2016 | Johnston et al. |
| 2016/0351029 A1 * | 12/2016 | Fawcett ............ G08B 13/1463 |
| 2017/0245663 A1 * | 8/2017 | Berglund ............... G08B 13/14 |
| 2019/0059612 A1 | 2/2019 | Johnston et al. |
| 2020/0178704 A1 | 6/2020 | Johnston et al. |

OTHER PUBLICATIONS

"User Guide, Freedom Micro Installation Guide", dated 2013, 6 pages, MTI, Hillsboro, Oregon.

"Freedom Micro"; dated 2013, 2 pages, Mobile Technologies, Inc., Hillsboro, Oregon.

Extended European Search Report from corresponding European Patent Application No. 14852614.8 dated Aug. 24, 2016; date of completion of the search Aug. 17, 2016; 6 pages.

Examination report from corresponding European Patent Application No. 14852614.8, dated Jul. 18, 2017 (4 pages).

"Installation Guide, Tablet Quick Disconnect Bracket (K-TABQD-BKT)", dated 2012, 1 page, Vanguard Protex Global, Inc., Oldsmar, Florida.

Photograph of "VP-1296—'CORE' Quick Release Bracket", date unknown, 1 page, Vanguard Protex Global, Inc., Oldsmar, Florida.

* cited by examiner

QUICK RELEASE SENSOR FOR MERCHANDISE DISPLAY

CROSS REFERENCE TO RELATED APPLICATIONS

This application is continuation of U.S. application Ser. No. 17/681,083, filed on Feb. 25, 2022, which is an continuation of U.S. application Ser. No. 17/175,207, filed on Feb. 12, 2021, and now U.S. Pat. No. 11,259,653, which is a continuation of U.S. application Ser. No. 16/780,339, filed on Feb. 3, 2020, and now U.S. Pat. No. 10,918,224, which is a continuation of U.S. application Ser. No. 16/169,597, filed on Oct. 24, 2018, which is a continuation of U.S. application Ser. No. 15/024,152, filed on Mar. 23, 2016, and now U.S. Pat. No. 10,111,537, which is a 371 National Phase Entry of International Application No. PCT/US2014/059415, filed Oct. 7, 2014, and which claims the benefit of priority to U.S. Provisional Patent Application No. 61/888,157 filed on Oct. 8, 2013, and to U.S. Provisional Patent Application No. 61/895,722 filed on Oct. 25, 2013, the entire disclosures of which are incorporated herein by reference.

FIELD OF THE INVENTION

Embodiments of the present invention relate generally to sensors for merchandise display security systems for displaying and protecting an article of merchandise from theft.

BACKGROUND OF THE INVENTION

Retailers routinely display handheld electronic merchandise, such as mobile (e.g. cellular) telephones, gaming consoles, personal data assistants (PDAs), global positioning system (GPS) devices, e-readers, tablets, media players, digital video recorders (DVRs), cameras and the like, for customers to examine before making a purchase. In some instances, the retailer desires the handheld electronic merchandise to be provided with electrical power so that a potential purchaser can evaluate the operation and features of the merchandise as well. At the same time, the retailer does not want the article of merchandise being displayed to be stolen or removed from the display by an unauthorized person. Accordingly, the article of merchandise is attached to a merchandise display security device that protects the article of merchandise from theft and unauthorized removal from the display. The merchandise display security device typically includes a sensor to which the article of merchandise is attached that indicates whether the article of merchandise has been separated from the sensor. In the event that the article of merchandise is detached from the sensor, an alarm signal, such as an audible, visible and/or haptic alarm is activated to alert store personnel to a possible attempted theft, or an unauthorized removal of the merchandise from the display.

Some security devices include a power cord that extends between and electrically connects a display stand including a sensor and an external source of power, such as an electrical outlet or power transformer. The security device may further include a power adapter cord extending between and electrically connecting the sensor and an article of merchandise attached to the sensor. However, some articles of merchandise are powered solely by batteries and do not include an input port for receiving power from a power cord. Replacement of the batteries can be problematic when the sensor is attached to the merchandise and blocks ready access to the batteries. In addition, it can be cumbersome to remove the sensor and cord for storing the article of merchandise when not in use.

SUMMARY OF THE INVENTION

In one aspect, the invention is embodied by a merchandise display security system for displaying and protecting an article of merchandise. The security system includes a merchandise bracket configured to be secured to the article of merchandise and a sensor configured to releasably engage the merchandise bracket and to detect unauthorized removal of the merchandise bracket or the sensor from the article of merchandise. The sensor is configured to be releasably engaged with the merchandise bracket such that the sensor is removable from the merchandise bracket while the merchandise bracket remains secured to the article of merchandise.

In another aspect, the invention is embodied by a merchandise display security system for displaying and protecting an article of merchandise including a removable component. The security system includes a merchandise bracket configured to be secured to the article of merchandise so as to not impede access to the removable component of the article of merchandise. The security system further includes a sensor configured to releasably engage the merchandise bracket and to impede access to the removable component of the article of merchandise. The sensor includes a quick-release mechanism configured to releasably engage the merchandise bracket, such that the sensor is removable from the merchandise bracket when the quick-release mechanism is activated.

In another aspect, the invention is embodied by a method for displaying and protecting an article of merchandise including a removable component. The method includes securing a merchandise bracket to the article of merchandise, and releasably engaging a sensor to the merchandise bracket. The sensor is configured to detect unauthorized removal of the merchandise bracket or the sensor from the article of merchandise. The sensor is releasably engaged with the merchandise bracket such that the sensor is removable from the merchandise bracket while the merchandise bracket remains secured to the article of merchandise.

BRIEF DESCRIPTION OF THE DRAWING FIGURES

The detailed description of the invention provided hereafter may be better understood with reference to the accompanying drawing figures, which depict embodiments of merchandise display security systems for displaying and protecting an article of merchandise from theft.

DETAILED DESCRIPTION OF EMBODIMENTS OF THE INVENTION

Figure 1:
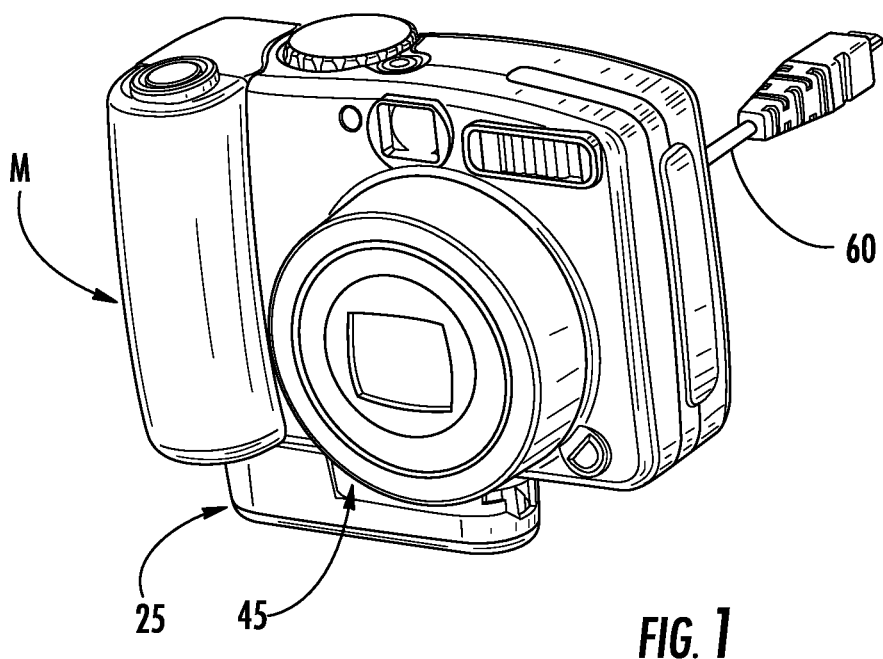
FIG. 1 is a perspective view of a merchandise display security system according to one embodiment of the present invention showing a sensor attached to an article of merchandise and adapted to be supported on a merchandise display in a retail store.

Referring now to the accompanying drawing figures wherein like reference numerals denote like elements throughout the various views, one or more embodiments of a merchandise display security system for displaying and protecting an article of merchandise are shown. More particularly, embodiments of a merchandise display security system are provided for monitoring whether an article of merchandise is attached to the security system. As shown and described herein, embodiments of the merchandise display security system include electronics for monitoring a proximity sensor in contact with the article of merchandise and for activating an alarm in the event that the article of merchandise is separated from the security system.

Embodiments of the present invention are directed to merchandise display security systems for displaying and protecting an article of merchandise M supported on a merchandise display or other support surface, for example, a tabletop, counter, shelf or the like, located in a retail store, from theft or unauthorized removal. The article of merchandise M is typically a display model or sample of handheld electronic merchandise, such as a mobile (e.g., cellular) telephone, Smartphone, gaming console, personal data assistant (PDA), global positioning system (GPS) device, e-reader, tablet, media player, digital video recorder (DVR), handheld camera, and the like, for customers to examine. The illustrated embodiments of merchandise display security systems are configured for use with a digital camera. However, the article of merchandise M may be any desired type of handheld, portable electronic merchandise or device. The article of merchandise M may be attached to the merchandise display security system 20 and displayed in a powered state so that potential purchasers are able to evaluate the operation and features of the merchandise when making a decision whether to purchase the item. In the embodiments illustrated herein, the article of merchandise M may be a digital camera having an internal power source. For example, the article of merchandise M may be provided with one or more internal batteries that may be replaced when discharged, or recharged to retain a charge of electrical power. For example, the article of merchandise M may have a removable battery door 22 (see, e.g., FIG. 3) for accessing an internal battery compartment.

Figure 6:
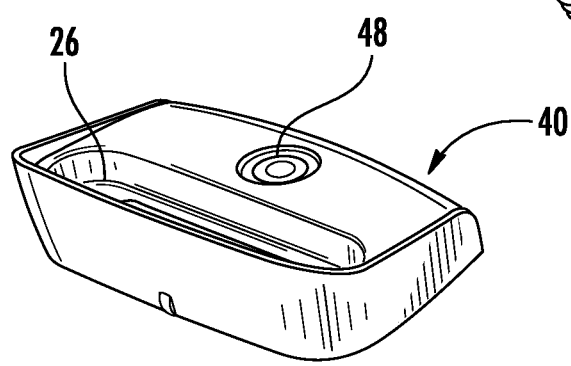
FIG. 6 is a perspective view showing a base configured for supporting the sensor and the article of merchandise of FIG. 1 on a merchandise display or support surface in a retail store.
Figure 7:
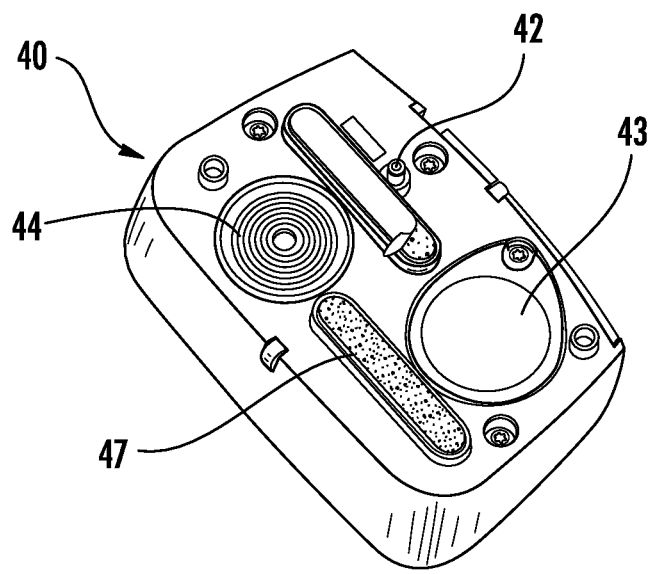
FIG. 7 is a perspective view of the underside (i.e., bottom) of the base shown in FIG. 6.
Figure 8:
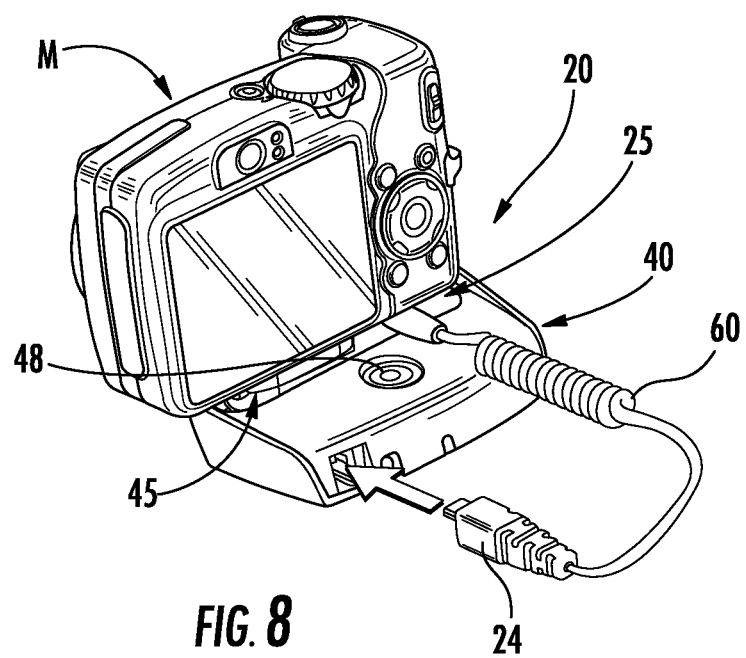
FIG. 8 is a perspective view showing the sensor of FIG. 1 being electrically connected to the base of FIG. 6.

FIGS. 1-10 illustrate one embodiment of a merchandise display security system 10 including a sensor 25. The merchandise display security system 20 comprises a base 40 (see, e.g., FIG. 6 and FIG. 7) configured for removably supporting the sensor 25 and the article of merchandise M thereon in a display orientation (see, e.g., FIG. 8). The base 40 and the sensor 25 are electrically connected with a cable 60, as shown in FIG. 8. In some embodiments, the cable 60 comprises a length of an elastic or otherwise extensible electrical cable. As shown herein, at least a portion of the cable 60 may be a helical coil cable similar to a conventional telephone handset cord comprising an outer sheath made of an insulating material surrounding a plurality of conductors for a purpose to be described hereafter. In one embodiment, one end of the cable 60 comprises a connector 24, for example a modular registered jack (RJ) telephone plug, configured to electrically connect the conductors of the cable to the base 40. The other end of the cable 60 may be "hard-wired" into the sensor 25. However, if desired, the other end of the cable 60 may comprise a connector, for example likewise a modular (RJ) telephone plug, configured to electrically connect the conductors of the cable to electronics disposed within the sensor 25.

The base 40 (sometimes also referred to as a "puck" or "medallion") comprises a body configured for removably supporting the sensor 25 and the article of merchandise M in the desired display orientation on a merchandise display or other support surface, for example, a tabletop, counter, shelf or the like, located in a retail store. The base 40 may be any display stand, module, pedestal or the like that permits a potential purchaser to examine an article of merchandise in an unpowered state and/or to operate an article of merchandise in a powered state. If desired, the base 40 and the sensor 25 may be formed with opposing geometry, or alternatively, provided with one or more magnets for aligning the sensor and the article of merchandise M in the desired display orientation. The base 40 may be any desired shape and configuration depending on the article of merchandise M to be supported. For example, FIG. 6 shows that the base may include a slot 26 or opening for receiving the sensor therein. Moreover, the base 40 may be electrically connected to an external power source for powering its electrical components and/or may include an internal power source, such as a battery. For example, FIG. 7 shows that the base may include a movable battery door 43 for accessing a battery compartment, a speaker or piezoelectric device 44 for emitting an audible signal, and pressure-sensitive adhesive 47 for securing the base to the merchandise display or support surface. Alternatively, or in addition, the base 40 could be secured to the merchandise display or support surface using any desired technique, such as with adhesives and/or fasteners.

In one embodiment, the merchandise display security system 20 further includes alarm electronics or circuitry. In the illustrated embodiments, the alarm electronics is integrated into the base 40. The alarm electronics may be electrically coupled to the cable 60. The alarm electronics may be further electrically coupled to a power cord for receiving power from an external power source, and/or to an internal power source, such as a battery, disposed within the base 40. Furthermore, the alarm electronics may include circuitry for receiving a security signal from the sensor 25 in response to a security event, such as when the sensor has been removed from the article of merchandise M or the cable 60 has been severed, cut or disconnected. The alarm electronics may further include functionality for providing an audible and/or visible alarm.

In one embodiment, the alarm electronics (e.g., housed within base 40) may be electrically connected to the sensor 25 by conductors disposed within one or more cables, such as cable 60. As such, the alarm electronics may operate to monitor the state of a sensor switch, for example, a conventional proximity or limit switch 30 provided on the sensor 25 (see, e.g., FIG. 4), through cable 60 and to activate an audible and/or visible alarm in the event that the article of merchandise M is separated from the sensor. For example, a sense loop may be defined through the cable 60 to the sensor 25 such that when the sense loop is interrupted (e.g., cable 60 is severed, cut or disconnected, or sensor 25 is removed from article of merchandise M), the alarm electronics is configured to detect this interruption. Base 40 may further comprise a sensor switch 42, for example, a conventional proximity or limit switch that is configured to engage the merchandise display or support surface when the base is disposed on the merchandise display or support surface. Sensor switch 42 may be electrically connected to the alarm electronics, which operate to monitor the state of switch 42 and to activate an audible and/or visible alarm in the event that base 40 is separated from the merchandise display or support surface in an unauthorized manner.

Base 40 may also comprise a communication port 48 for permitting communication with electronics housed within the base to arm and disarm the alarm electronics. With the alarm electronics disarmed, an authorized person can separate the article of merchandise M from the sensor 25, disconnect the cable 60 from the base 40, and/or separate the base from the merchandise display or support surface. For example, the communication port 48 may communicate via a wireless signal, such as via infrared (IR) communication, with a key 80, as illustrated in FIG. 9B. In some embodiments, the key 80 and the electronics may exchange a security code via communications port 48, and the alarm electronics may be armed or disarmed when the security codes match. In one embodiment, the communication port 48 is accessible when the article of merchandise M and sensor 25 are supported on the base 40. It is understood that the communication port 48 may be located at any desired position on the base 40, or at another accessible location provided on the merchandise display or support surface.

In some embodiments, the merchandise display security system 20 also includes a merchandise bracket 45 that is configured for coupling to the article of merchandise M. (see, e.g., FIG. 2 and FIG. 3). The merchandise bracket 45 is further configured to be releasably secured to the sensor 25 (see, e.g., FIG. 4). In particular, the merchandise bracket 45 may include a quick-release mechanism for releasing the sensor 25 from the article of merchandise M. The sensor 25 may be disengaged from the merchandise bracket 45 such that only the merchandise bracket is engaged with the article of merchandise M. Where the article of merchandise M includes a battery compartment (e.g., accessible through battery door 22), the merchandise bracket 45 is sized and configured to allow access to the battery compartment with the merchandise bracket attached to the article of merchandise M when the sensor 25 is removed from the merchandise bracket and the article of merchandise. Notably, FIG. 3 illustrates that the merchandise bracket 45 is sized and configured so as to not block or otherwise impede access to the battery door 22 of the article of merchandise M while the merchandise bracket is secured to the article of merchandise.

Thus, unlike conventional systems, devices and methods that require fasteners and cumbersome techniques for attaching the sensor 25 to the article of merchandise M, the battery compartment is readily accessible by an authorized person. In particular, the authorized person is not required to disassemble the sensor 25 or to remove any fasteners in order to detach the sensor and access the battery compartment. Therefore, retailers are able to replace batteries of an article or merchandise M in a more efficient manner, thereby allowing potential purchasers to examine and operate the article of merchandise M in a powered state. In addition, the batteries of the article of merchandise M are not readily removable when the sensor 25 is engaged with the merchandise bracket 45, which prevents the batteries from being removed from the article of merchandise by an unauthorized person.

Figure 2:
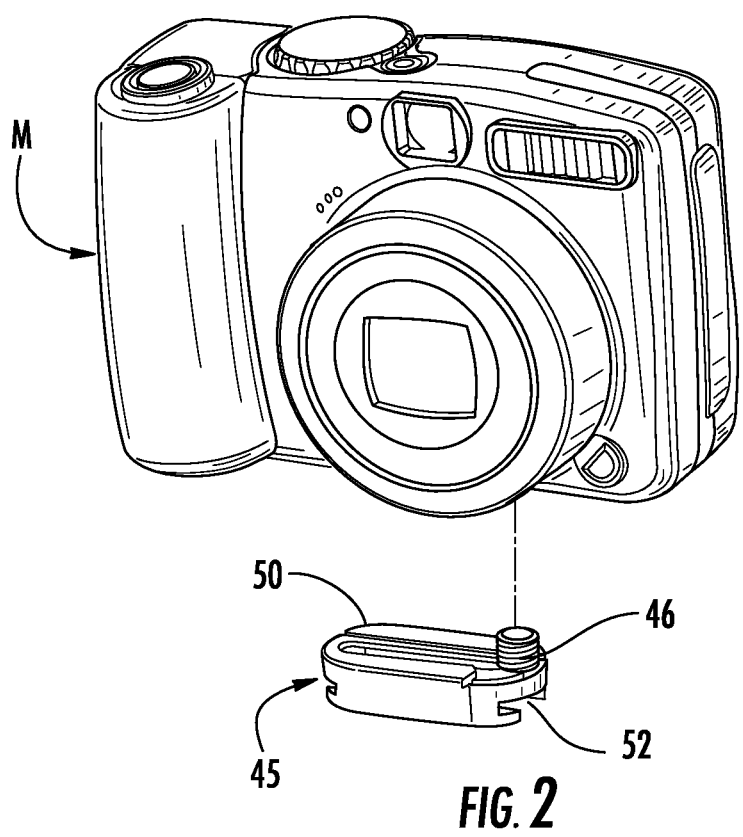
FIG. 2 is an exploded perspective view of a merchandise bracket for attaching the sensor shown in FIG. 1 to the article of merchandise.
Figure 3:
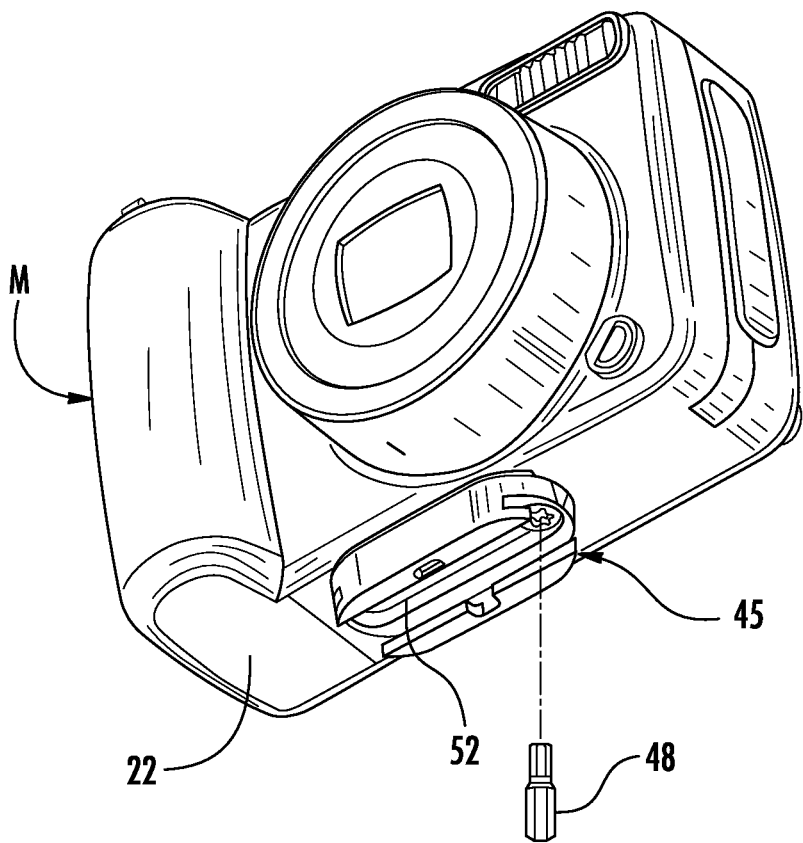
FIG. 3 is a perspective view of the merchandise bracket shown in FIG. 2 being attached to the article of merchandise using a special tool.
Figure 4:
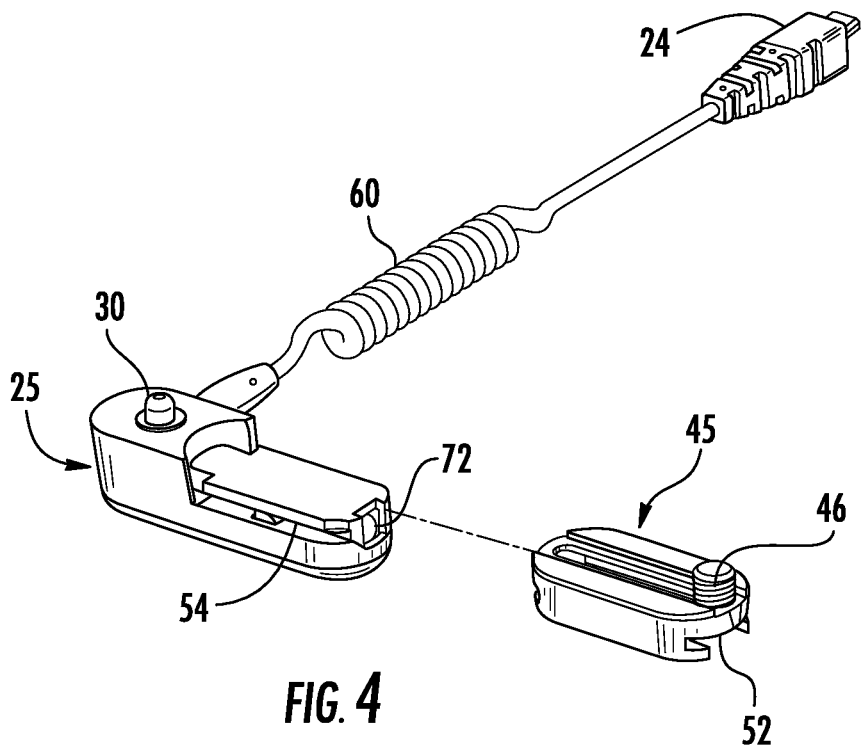
FIG. 4 is an exploded perspective view of the sensor shown in FIG. 1 and the merchandise bracket shown in FIG. 2 configured for sliding engagement with one another.
Figure 5A:
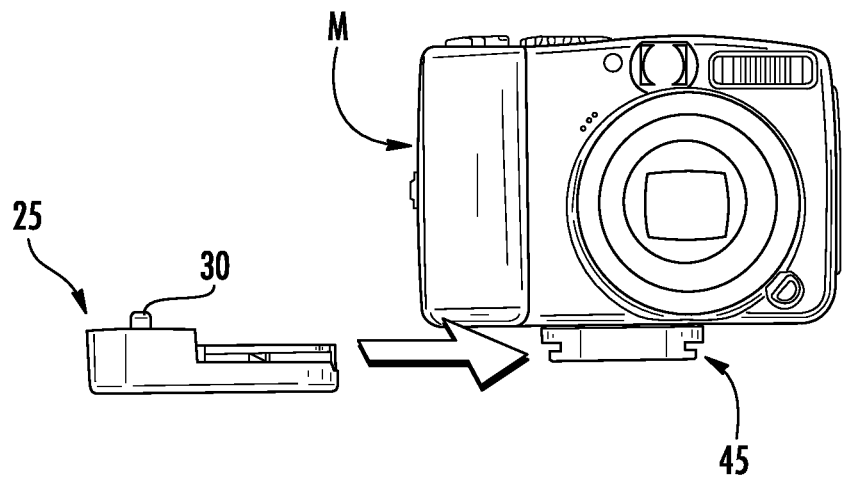
FIG. 5A is an elevation view showing the merchandise bracket of FIG. 2 attached to the article of merchandise and the sensor of FIG. 1 slidably engaging with the merchandise bracket.
Figure 5B:
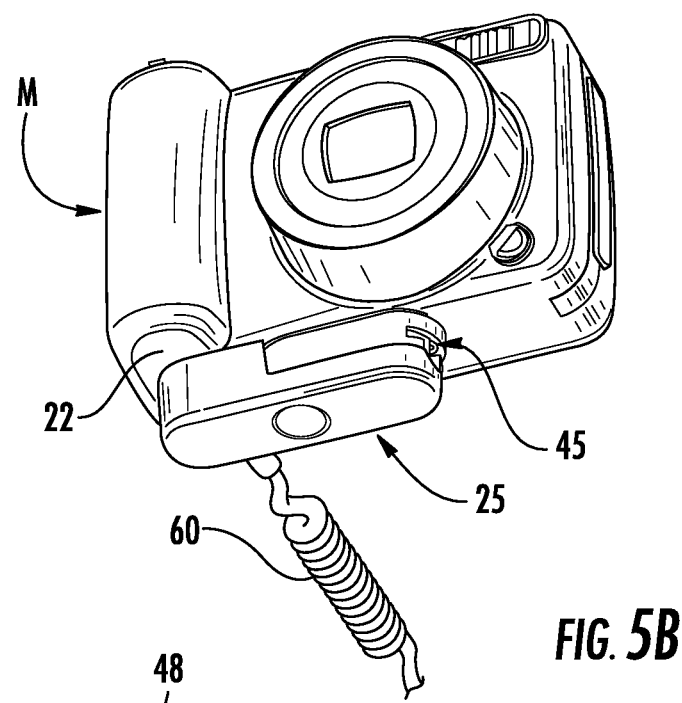
FIG. 5B is a perspective view showing the merchandise bracket of FIG. 2 and the sensor of FIG. 1 attached to the article of merchandise.

In one embodiment shown in FIG. 2, the merchandise bracket 45 may be configured to attach to the article of merchandise M with a fastener 46. The fastener 46 may be configured to engage an internally threaded tripod hole provided on the article of merchandise M. In some embodiments, the fastener 46 has a proprietary head that is configured to mate with a proprietary tool bit 48 or other suitable special tool, as illustrated in FIG. 3. The merchandise bracket 45 could be further secured to the article of merchandise M with an adhesive, such as with pressure sensitive adhesive 50, which may resist rotation of the merchandise bracket relative to the article of merchandise. It is understood that the merchandise bracket 45 and/or sensor 25 may include other anti-rotation means, such as an anti-rotation bracket.

Figure 16:
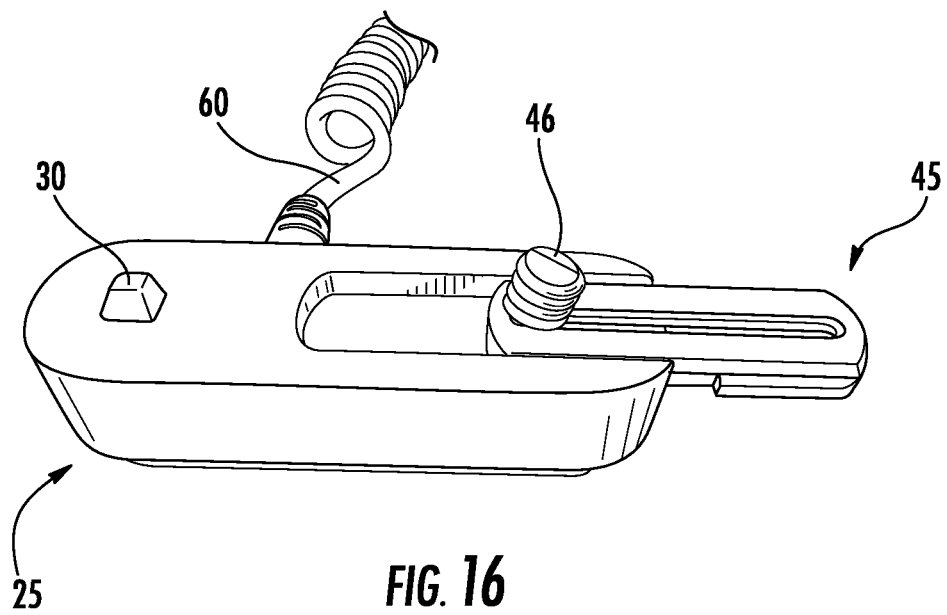
FIG. 16 is an enlarged perspective view of a sensor and a merchandise bracket according to another embodiment of the present invention.
Figure 17:
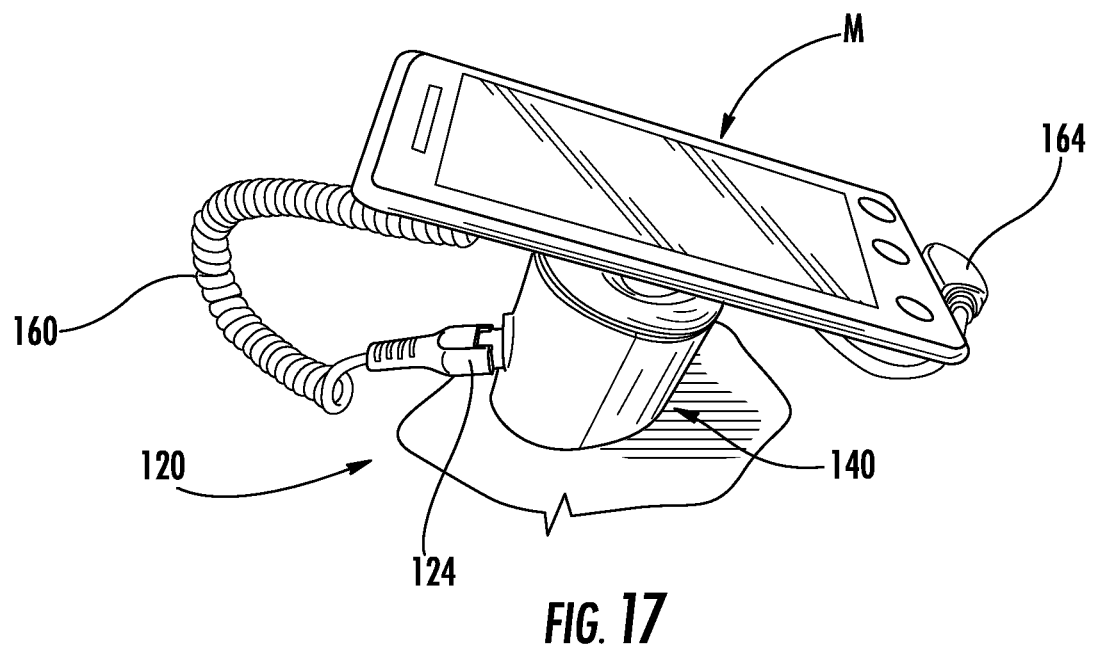
FIG. 17 is a perspective view of a merchandise display security system according to another embodiment of the present invention showing a sensor attached to an article of merchandise and adapted to be supported on a merchandise display in a retail store.
Figure 18:
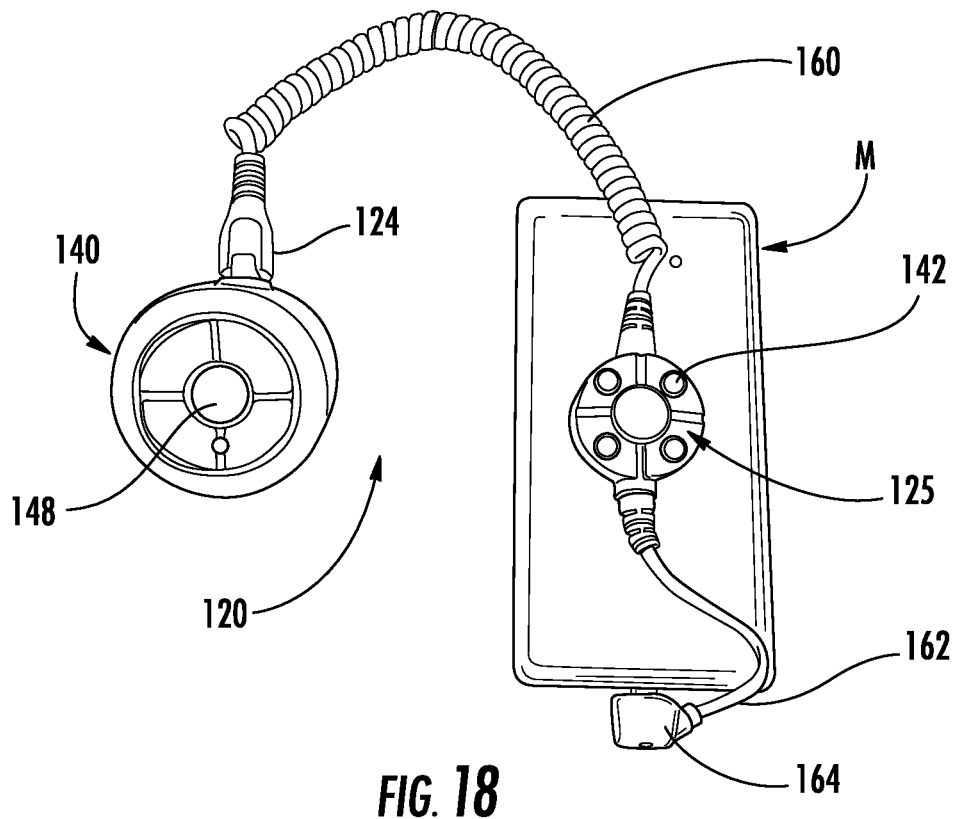
FIG. 18 is a plan view showing the sensor of FIG. 17 removed from a base of the merchandise display security system.

As discussed above, the merchandise bracket 45 is configured to releasably engage the sensor 25. In one embodiment shown in FIG. 4, the merchandise bracket 45 and the sensor 25 are slidably engaged with one another. In this regard, the merchandise bracket 45 may include one or more slots 52 configured to engage the sensor, and the sensor may include one or more undercuts, recesses, slots or the like 54 that are configured to engage the merchandise bracket. In one embodiment, the sensor 25 and merchandise bracket 45 may engage one another in dovetail engagement (see, e.g., FIG. 4). Furthermore, an outer peripheral surface of the merchandise bracket 45 may be visible when engaged with the sensor 25 and may substantially correspond to an outer peripheral surface of the sensor to define a uniform profile when the merchandise bracket is secured to the article of merchandise M. Thus, the merchandise bracket 45 may be slid into locking engagement with the sensor 25 (see, e.g., FIG. 5A). When engaged with the merchandise bracket 45, the sensor 25 is sized and configured to block access to the battery door 22 (see, e.g., FIG. 5B). The sensor 25 could block any compartment or number of compartments typically located on the underside (i.e., bottom) of the article of merchandise M. As such, unauthorized persons are unable to access the battery door 22 or other compartment on the bottom of the article of merchandise M. It is understood that the sensor 25 and merchandise bracket 45 may be any desired configuration for facilitating engagement and disengagement thereof. For example, the merchandise bracket 45 could simply be an externally threaded stud that engages the internally threaded tripod hole and is configured to extend from the article of merchandise M to releasably engage the sensor 25. In another example, FIG. 16 shows an embodiment where the merchandise bracket 45 may be disposed internally within the sensor 25 such that the only exposed peripheral surface of the merchandise bracket is at the open end of the sensor when the sensor and the merchandise bracket are secured to an article of merchandise M.

Figure 10:
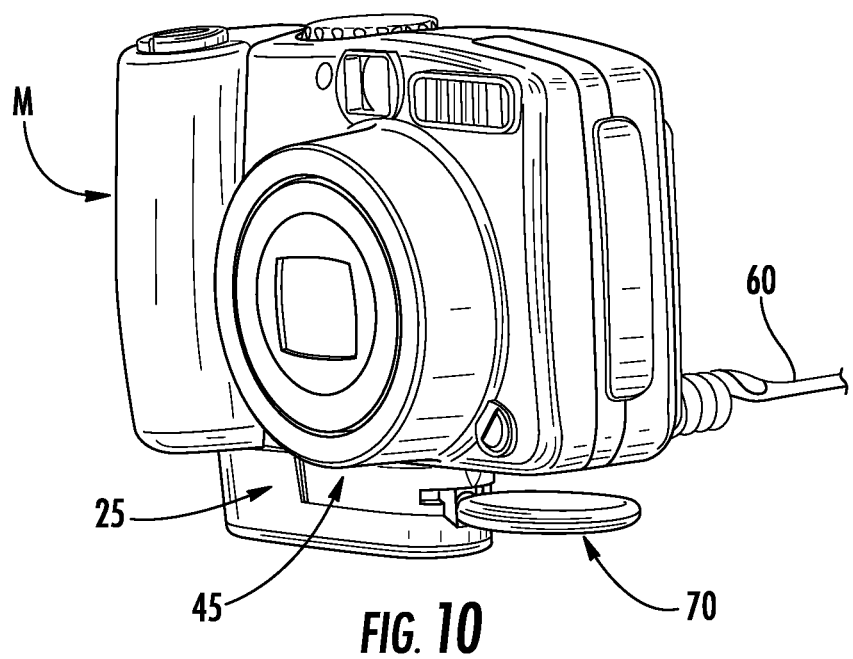
FIG. 10 is a perspective view of the sensor of FIG. 1 being removed from the merchandise bracket of FIG. 2 with a key.
Figure 11:
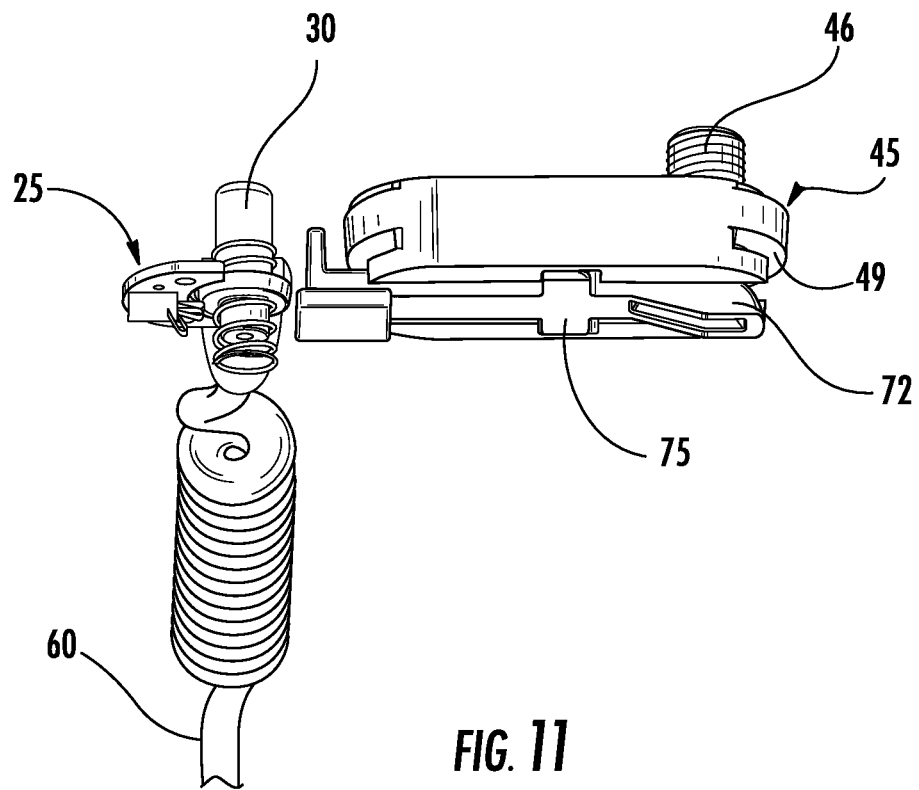
FIG. 11 is a perspective view of the sensor of FIG. 1 and the merchandise bracket of FIG. 2 shown with the housing of the sensor removed for purposes of clarity.
Figure 12:
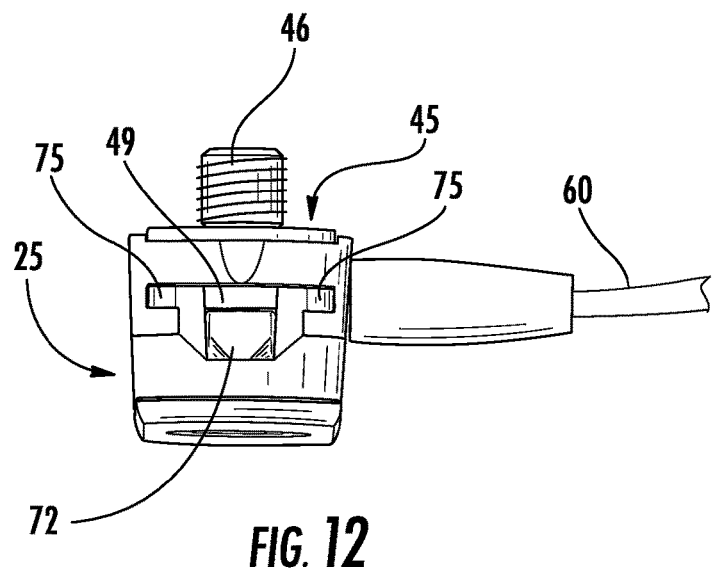
FIG. 12 is a side view of the sensor and the merchandise bracket shown in FIG. 11.

In some embodiments, a key may be required to remove the sensor 25 from the merchandise bracket 45. For example, a mechanical and/or electronic key may be used to disengage the sensor 25 from the merchandise bracket 45. FIG. 10 shows one embodiment of a key 70 configured to unlock the sensor 25 from the merchandise bracket 45. In this example, the sensor 25 may include a quick-release mechanism 72 (see, e.g., FIG. 11 and FIG. 12), which may be spring biased, and that is disengaged by the key 70, thereby allowing the sensor 25 and the merchandise bracket 45 to disengage from one another. The quick-release mechanism 72 may be configured to lock the sensor 25 on the merchandise bracket 45 without being disengaged with a key 70. FIG. 11 shows an example of such a quick-release mechanism 72 with the housing of the sensor 25 removed for purposes of clarity. In this embodiment, the quick-release mechanism 72 includes one or more engagement member(s) 75 engaged with the merchandise bracket 45 that are spring biased such that engagement of the key 70 with the quick-release mechanism disengages the engagement member(s) from the merchandise bracket. For example, engagement of the key 70 with the quick-release mechanism 72 may be used to bias the engagement member(s) 75 downwardly out of engagement with the merchandise bracket 45, thereby allowing the sensor 25 to slide laterally relative to the merchandise bracket. Thus, insertion of the key 70 through an opening 49 at an accessible end of the merchandise bracket 45 engages the quick-release mechanism 72, which disengages the merchandise bracket from the sensor 25 (see, e.g., FIG. 12). Once disengaged, the sensor 25 may be removed from the merchandise bracket 45. The engagement member(s) 75 may be spring biased upwardly such that sliding the senor 25 onto the merchandise bracket 45 once again causes the sensor to automatically engage the merchandise bracket. It is understood that the key 70 may be any suitable key, for example a proprietary key that is sized and configured to be inserted to engage the quick-release mechanism 72. Moreover, it is understood that the quick-release mechanism 72 may take many different forms, including electrical and/or mechanical latching and locking mechanisms.

Figure 9A:
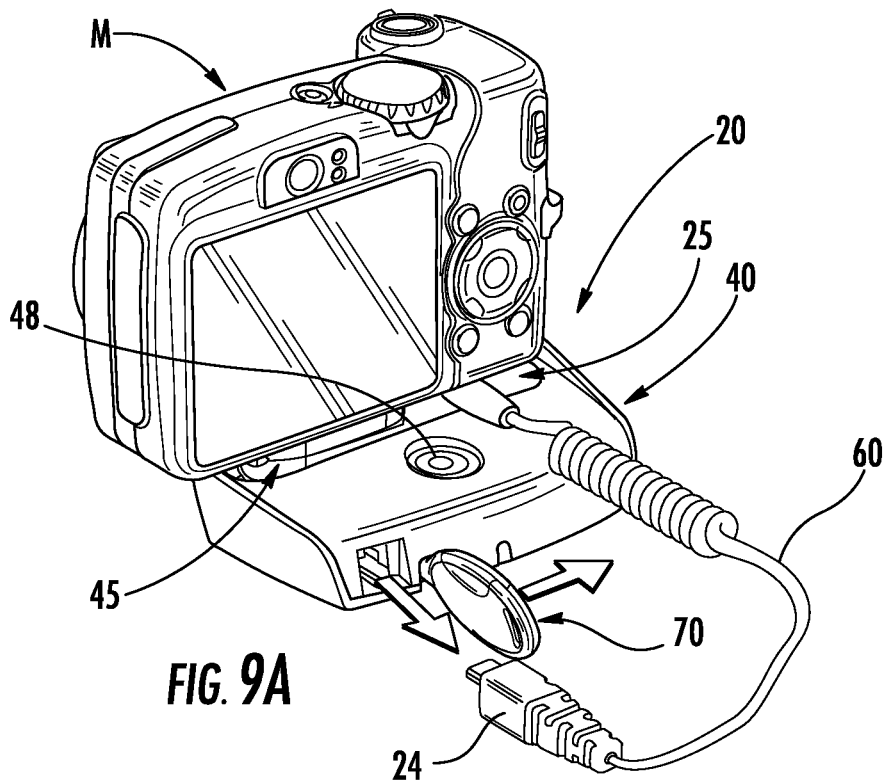
FIG. 9A and FIG. 9B are perspective views illustrating steps to remove the sensor of FIG. 1 from the base of FIG. 6 according to one embodiment of the present invention.
Figure 9B:
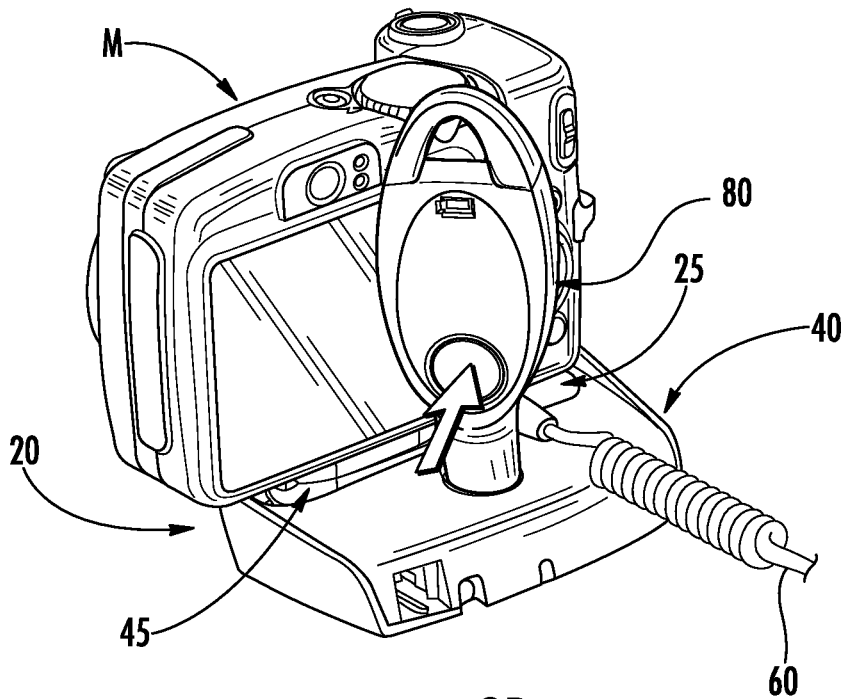

FIG. 9A and FIG. 9B illustrate an example of steps to remove the sensor 25 from the base 40 and the article of merchandise M. In this example, an authorized person may utilize key 70 to disengage the connector 24 of cable 60 from the base 40. Thus, the connector 24 and the base 40 may be in a locked configuration when engaged with one another and unlocked by the key 70. A second key 80 may be used to arm and/or disarm the alarm electronics in the base 40 by communicating with port 48, as discussed above. The alarm electronics disposed within the base 40 and/or the sensor 25 could be disarmed prior to the cable 60 being removed from the base. However, the cable 60 need not be removed in all instances, such as when an authorized person desires to simply replace or recharge batteries for the article of merchandise M. When disarmed, the authorized person can remove the sensor 25 from the merchandise bracket 45 and the article of merchandise M without triggering an alarm signal. Moreover, it is understood that the same key may be employed to unlock the connector 24 of the cable 60 of sensor 25 from the base 40 and to arm and/or disarm the alarm electronics, in addition to disengaging the sensor from the merchandise bracket 45.

Figure 13:
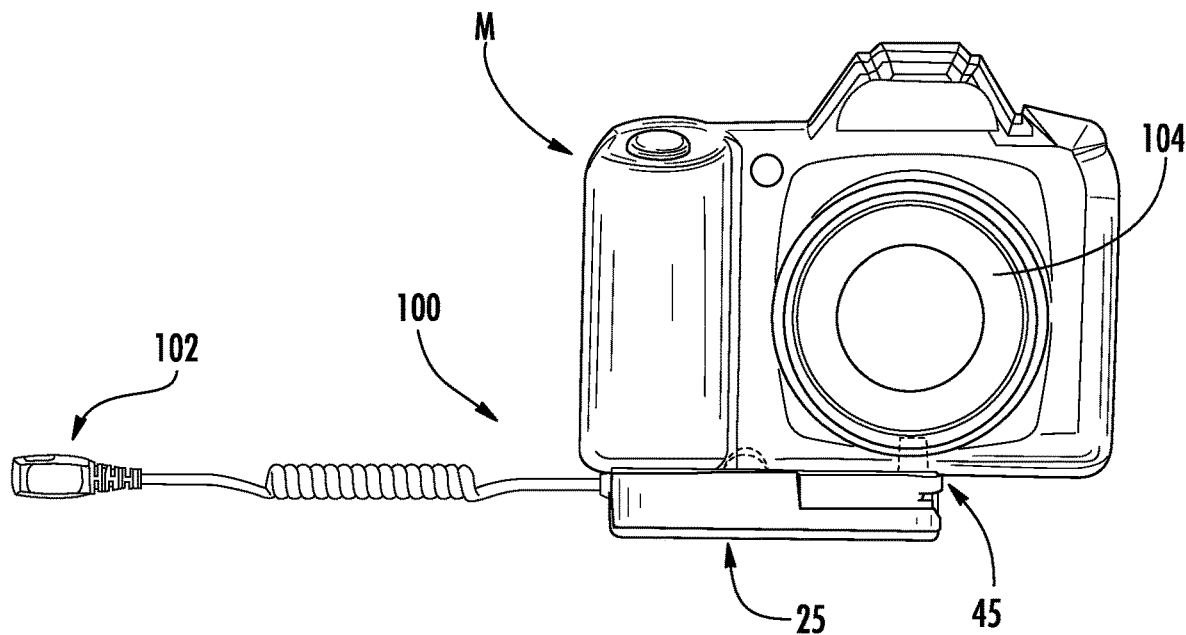
FIG. 13 is an elevation view of a merchandise display security system according to another embodiment of the present invention showing a sensor attached to an article of merchandise and adapted to be supported on a merchandise display in a retail store.
Figure 14:
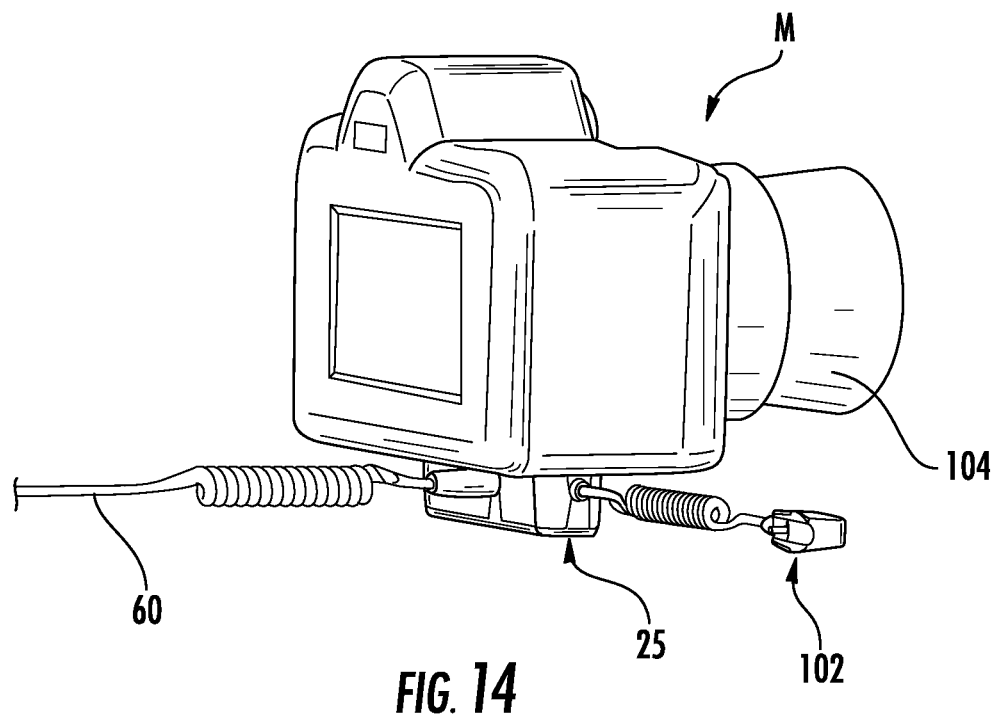
FIG. 14 is a perspective showing the sensor of FIG. 13 attached to the article of merchandise.
Figure 15:
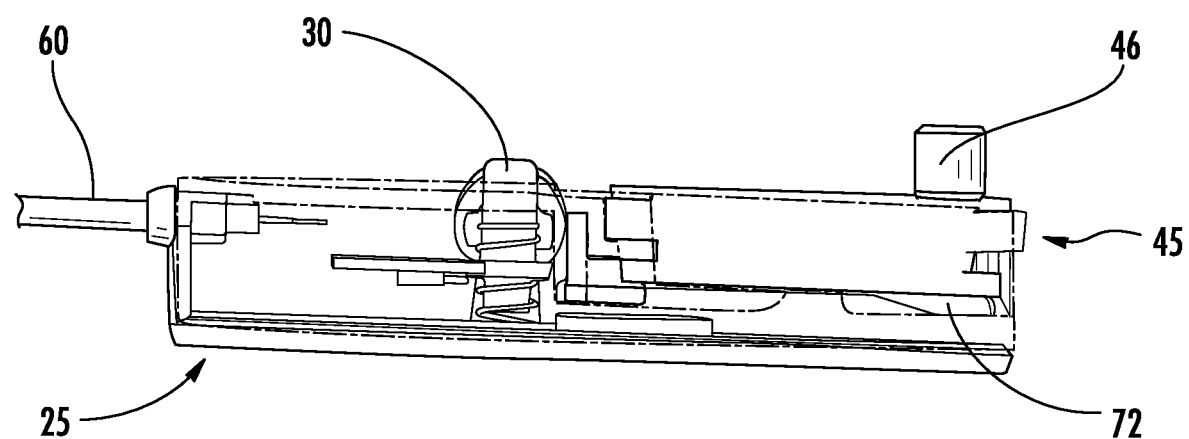
FIG. 15 is an enlarged elevation view showing the sensor of FIG. 13 and a merchandise bracket according to one embodiment of the preset invention.

FIGS. 13-15 illustrate another embodiment of a merchandise display security system 100 according to the invention. The merchandise display security system 100 is similar to those discussed above with the exception that a secondary sensor 102 may be used to secure a camera lens 104 or other removable component of the article of merchandise M. The secondary sensor 102 may be a proximity or pressure switch similar to those described above. The secondary sensor 102 may be electrically connected to the base 40 and associated electronics such that unauthorized removal of the sensor 25 from the camera lens results in the alarm electronics generating a security signal. FIG. 15 shows an example of the sensor 25 engaged with the merchandise bracket 45.

It is also apparent from the aforementioned embodiments that the sensor 25 and associated cable 60 may be removed from the merchandise bracket 45. In contrast, with some conventional sensors either only the cable may be removed from the sensor, or the entire sensor is removed from the article of merchandise. As such, embodiments of the present invention allow retailers to readily remove the sensor 25 and cable 60 such that the article of merchandise M may be stored when no longer desired to be on display, such as when a retail store is closed.

FIGS. 17-20 illustrate another embodiment of a sensor 125 for a merchandise display security system 120 according to the invention. The security system 125 is similar to the embodiments described above in that a sensor 125 and associated cable 160 are configured to be readily removed from the article of merchandise M via a quick-release feature. In some embodiments, the sensor 125 is also coupled to a power adapter, cord or cable 162 for supplying electrical power to the article of merchandise M. For example, the power cable 162 may include a connector 164 configured to releasably engage an input port of the article of merchandise M. Thus, the sensor 125, cable 160, and power cable 162 may be configured to provide power to the article of merchandise M when the power cable 162 is engaged with an input port of the article of merchandise. The sensor 125, cable 160, and power cable 162 may also be configured to define a sense loop therethrough such that severing, cutting and/or removing either cable 160 or power cable 162, or removal of the sensor 125 may result in the generation of a security signal as described above.

Figure 19:
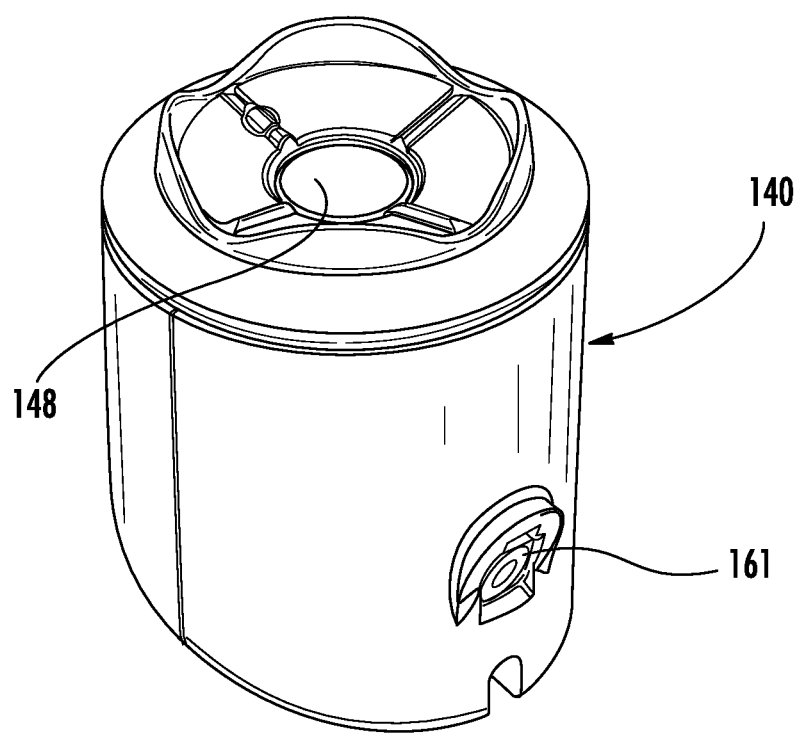
FIG. 19 is a perspective view showing the base of FIG. 18 in greater detail.
Figure 20:
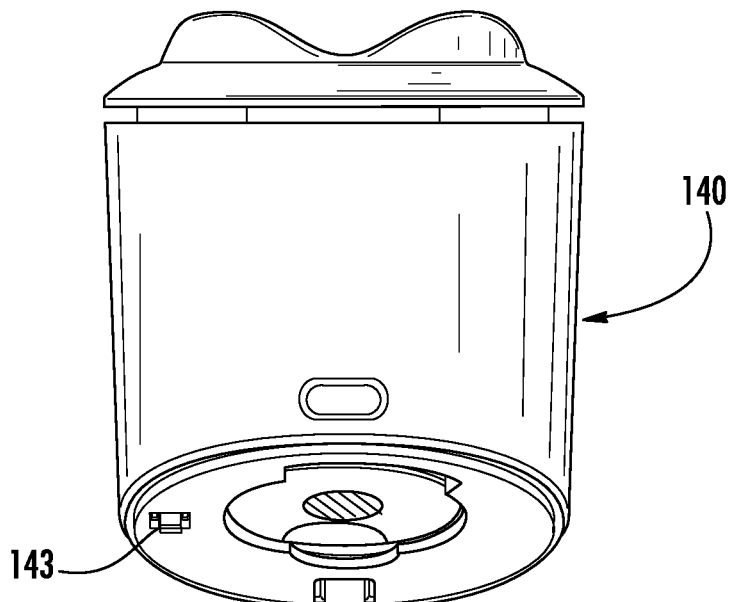
FIG. 20 is a perspective view showing the base of FIG. 18 from the underside.

The sensor 125 may be configured to be removably supported on a base 140. The base 140 may be operably engaged with the sensor 125 in a variety of manners. For example, the base 140 may be hardwired to the sensor 125 and include conductors configured to cooperate with conductors within the cable 160. Alternatively, the cable 160 may plug into a port 161 provided in the base 140, such as shown in FIG. 19. The base 140 may be in electrical communication with an external power source. The base 140 may further include an internal power source configured to provide power to the base in the event that power from an external power source is interrupted or lost. In some embodiments, the sensor 125 and/or base 140 include a pressure switch 143 or other mechanism, such as a proximity switch or limit switch, to detect unauthorized removal (see, e.g., FIG. 20). The base 140 may also be configured to generate a security signal in response to such unauthorized removal. Thus, should the connector 124 be removed from the base 140, the sensor 125 removed from the article, a cable cut, and/or the base removed from a power source, the base may be configured to generate a security signal.

The sensor 125 may include alignment features 142 (e.g., magnets) that are configured to align and interact with corresponding alignment features on the base 140. For example, the base 140 may include at least one internal magnet or magnetically attractable material disposed on the upper surface that is configured to operably engage a magnet 142 or magnetically attractable material on the sensor. In particular, the magnet(s) or magnetically attractable material of the base 140 is configured to align with and engage the magnet(s) or magnetically attractable material of the sensor 125 so that the sensor is removably supported on and secured to the base.

In another embodiment, the base 140 includes a window, port 148 or the like that is configured to receive a wireless security signal for arming and/or disarming the base. The port 148 may be disposed on an upper surface of the base 140. In some embodiments, the port 148 may be covered by the sensor 125 when the sensor is supported on the base 140. Furthermore, the wireless security signal may be any suitable signal configured to arm and/or disarm the alarm electronics disposed within the base 140 and/or the sensor 125, as previously discussed.

Figure 21:
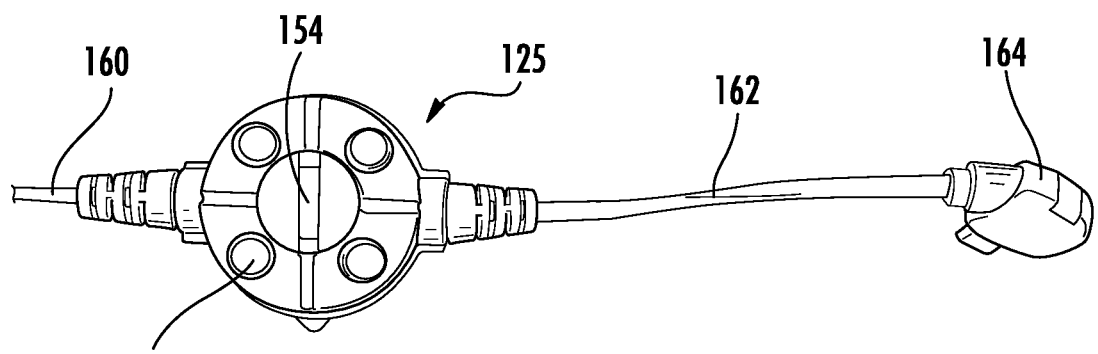
FIG. 21 is a plan view showing the sensor of FIG. 17.
Figure 22:
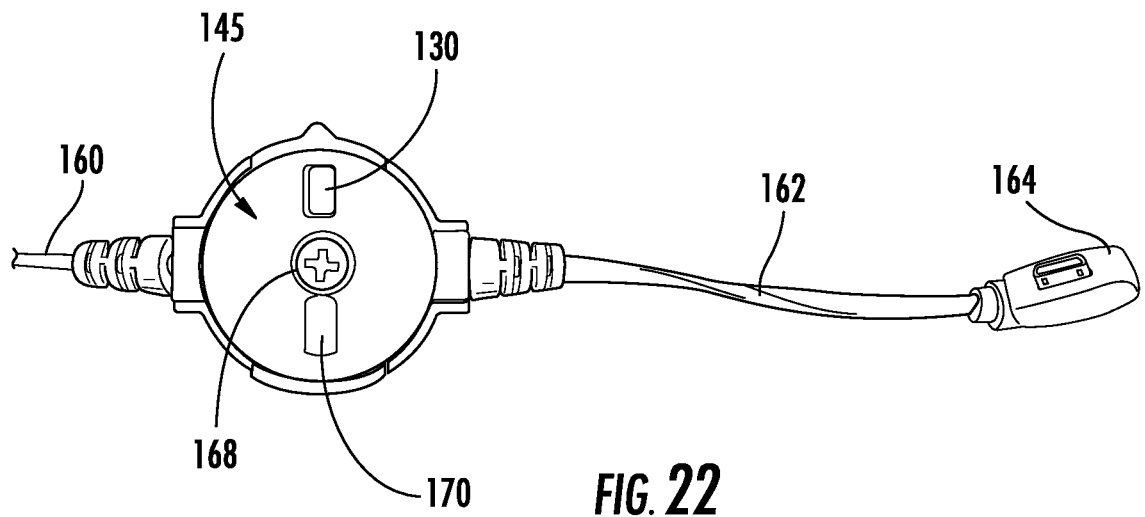
FIG. 22 is a plan view showing a merchandise bracket for attaching the sensor of FIG. 17 to the article of merchandise.
Figure 23:
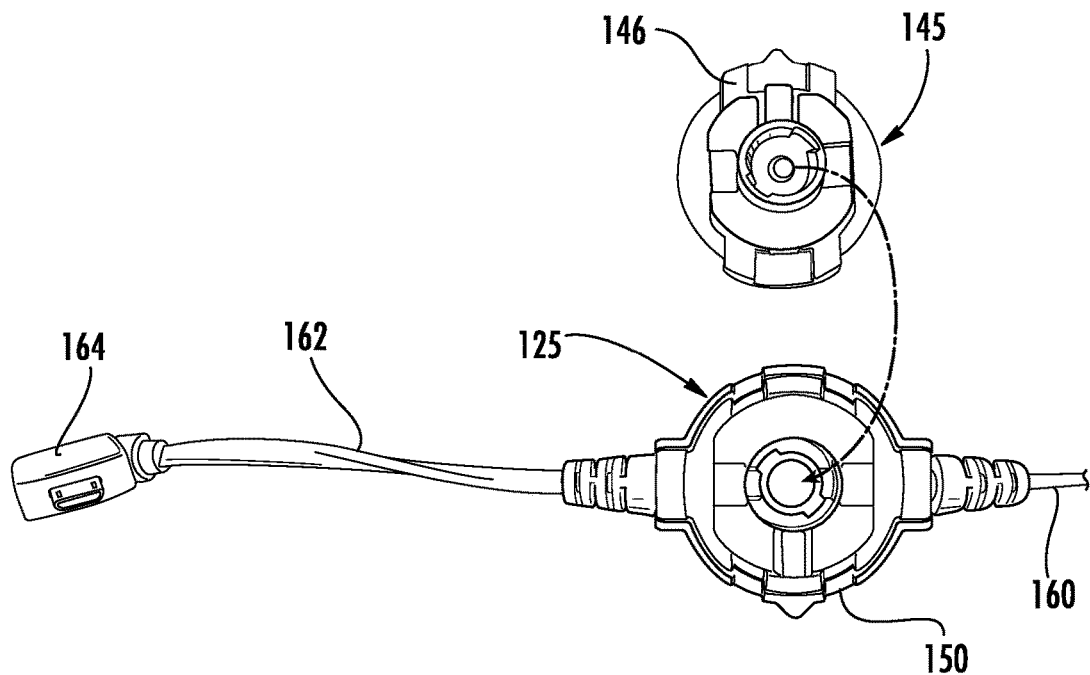
FIG. 23 is a plan view showing the merchandise bracket removed from the sensor.
Figure 24:
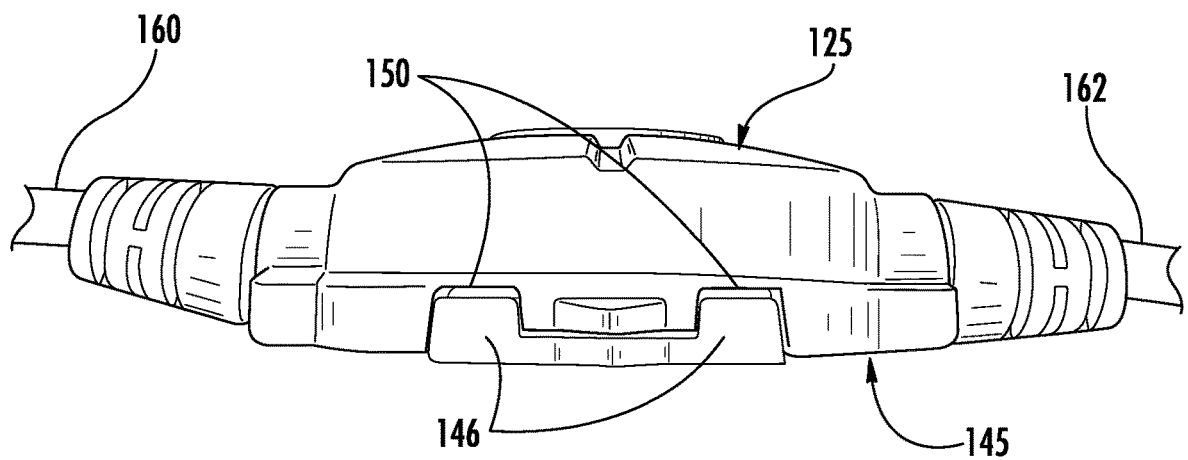
FIG. 24 is an enlarged side view showing the sensor attached to the merchandise bracket.
Figure 25:
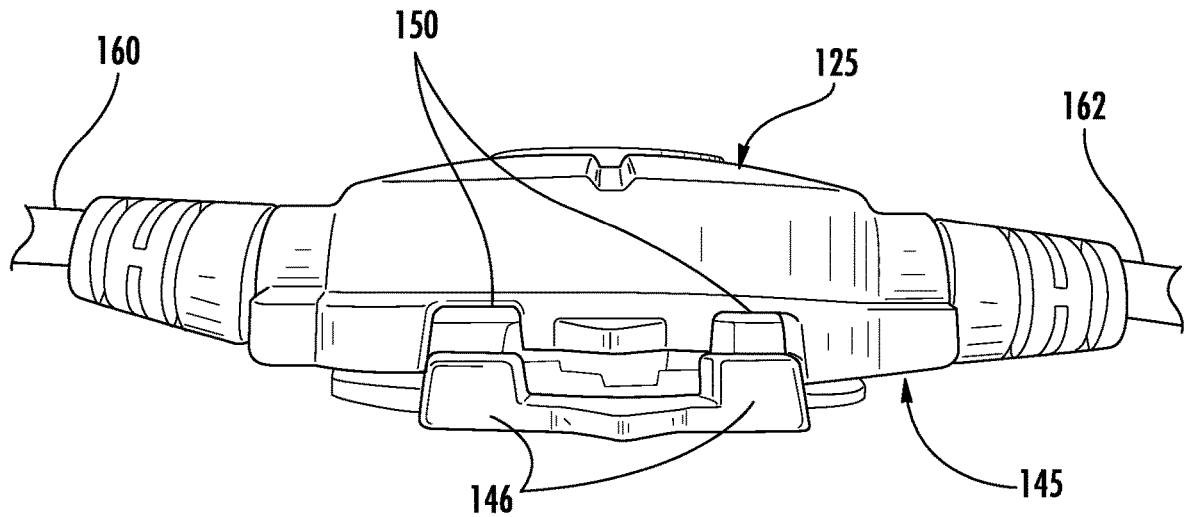
FIG. 25 is an enlarged side view showing the sensor being detached from the merchandise bracket.

In one embodiment, the security system 120 also includes a quick-release feature for removing the sensor 125 from a merchandise bracket 145. In this regard, FIGS. 21-27 show an embodiment of a sensor 125 that is configured to rotatably engage a merchandise bracket 145. The merchandise bracket 145 may be secured to the article of merchandise M with a pressure-sensitive adhesive or other suitable technique, while the sensor 125 may be removably secured to the merchandise bracket. In one embodiment, the merchandise bracket 145 is configured to be received by the sensor 125 and secured thereto. For example, FIGS. 23-25 show that the merchandise bracket 145 may include one or more engagement members 146 that are configured to engage corresponding engagement members 150 provided on the sensor 125. In the illustrated example, the engagement members 146 of the merchandise bracket are protrusions, while the engagement members 150 of the sensor are slots. As shown in FIGS. 23-25, the merchandise bracket 145 and sensor 125 may include a plurality of engagement members 146, 150, including engagement members that are radially opposite one another. It is understood that any variety of engagement members 146, 150 may be employed to align and engage the merchandise bracket 145 and sensor 125, and thus, the embodiments illustrated herein are exemplary and not intended to be limiting in any manner.

Figure 26:
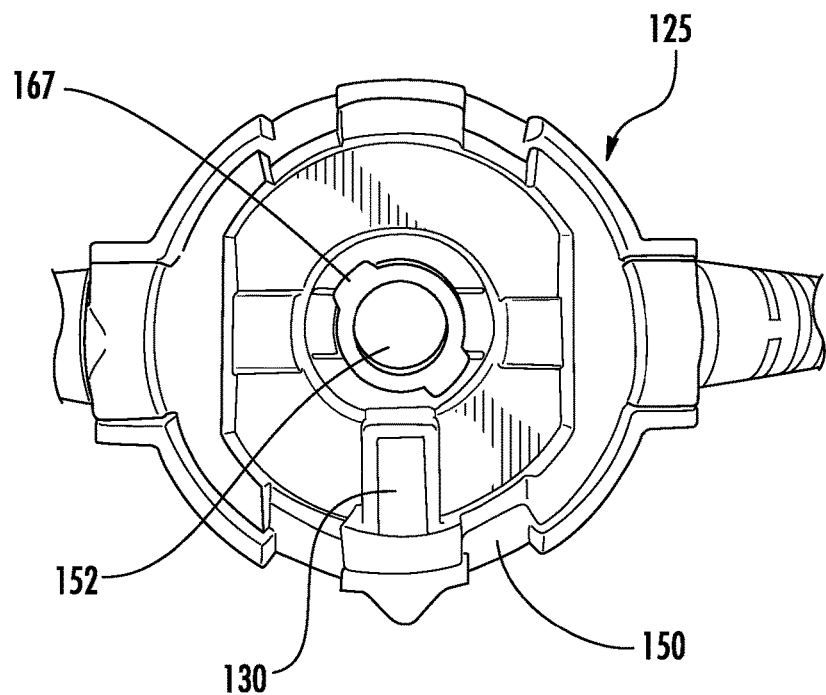
FIG. 26 is an enlarged plan view showing the sensor in greater detail.

With reference to FIG. 26, the sensor 125 may further include a rotatable quick-release mechanism 152. The rotatable quick-release mechanism 152 is configured to rotate relative to the housing of the sensor 125. For example, FIG. 21 shows that the rotatable quick-release mechanism 152 may include a head 154 that is configured to be engaged by a tool for manual rotation. FIG. 26 also shows that the rotatable quick-release mechanism 152 may also include one or more engagement features 167. In the illustrated example, the rotatable quick-release mechanism 152 includes a pair of engagement features (e.g., protrusions) 167 that extend outwardly and are radially opposite one another. Thus, rotation of the rotatable quick-release mechanism 152 causes the engagement features 167 to also rotate. FIG. 22 and FIG. 26 further show that the sensor 125 may include a sensor switch 130, similar to that previously described. The merchandise bracket 145 may define an opening 163 that is configured to receive the sensor switch 130 (see, e.g., FIG. 27). Thus, when the merchandise bracket 145 and sensor 125 are secured to one another, the sensor switch 130 is configured to extend through the opening 163 so as to be able to contact the article of merchandise M (see, e.g., FIG. 22).

Figure 28:
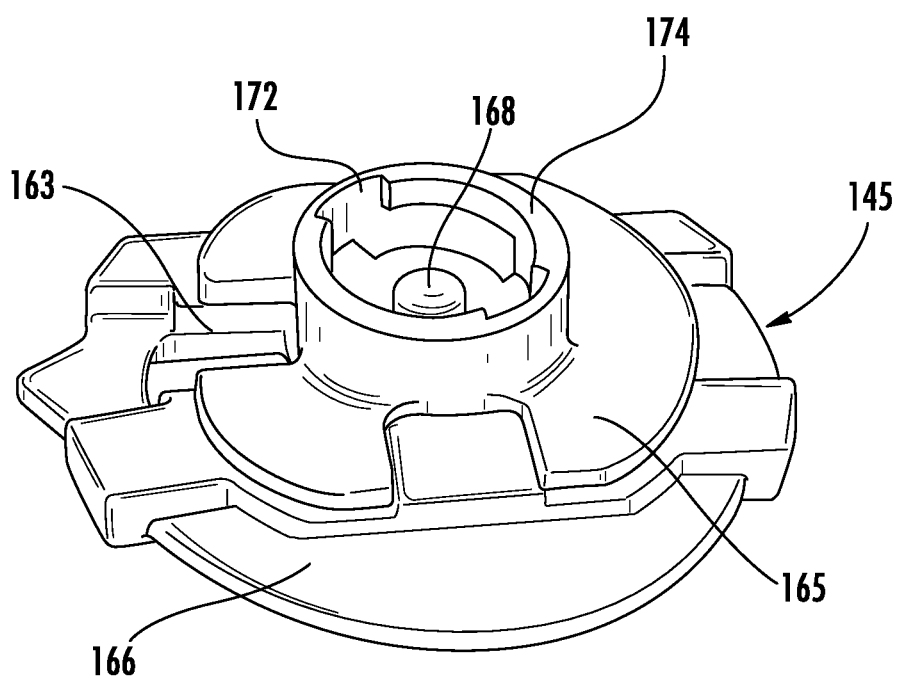
FIG. 28 is an enlarged perspective view showing the merchandise bracket in greater detail.
Figure 29:
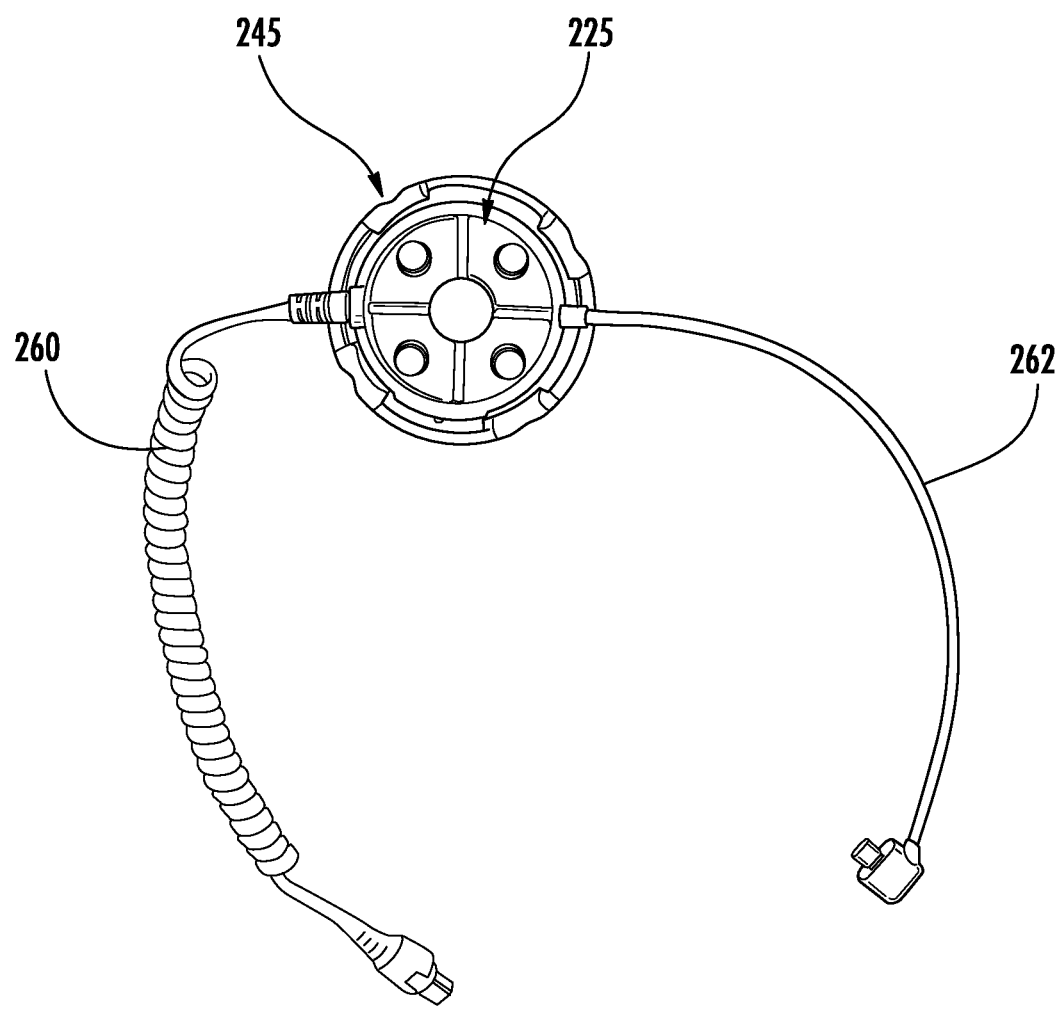
FIG. 29 is a plan view of a sensor and a merchandise bracket for a merchandise display security system according to another embodiment of the present invention.
Figure 30:
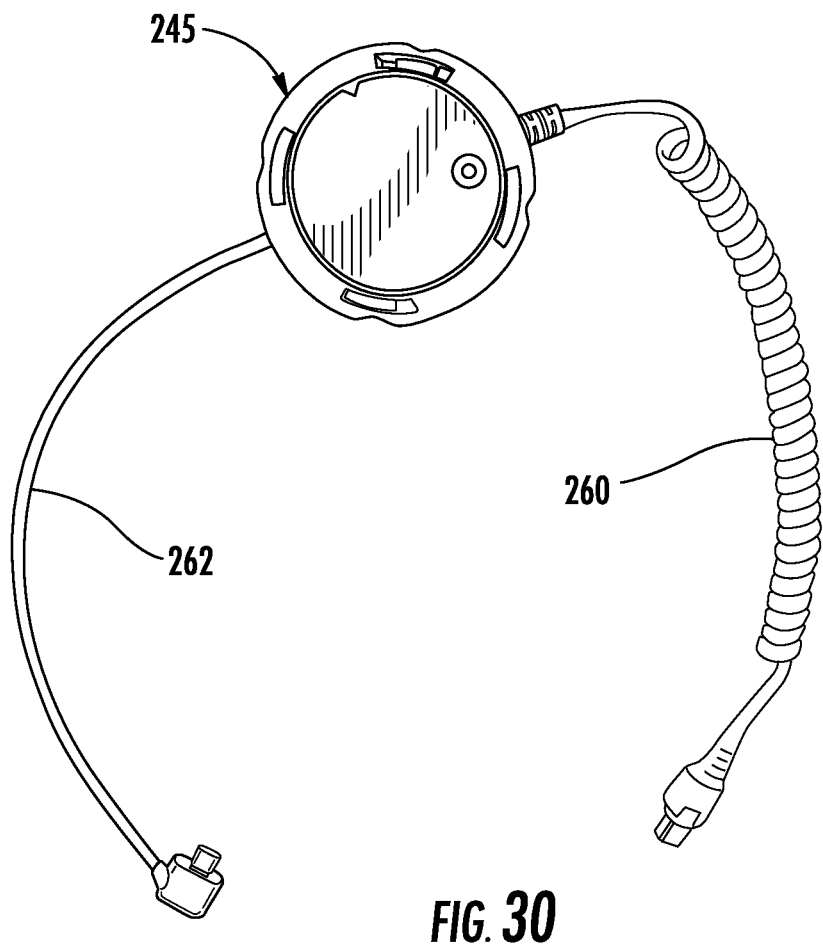
FIG. 30 is a plan view showing the merchandise bracket of FIG. 29.
Figure 31:
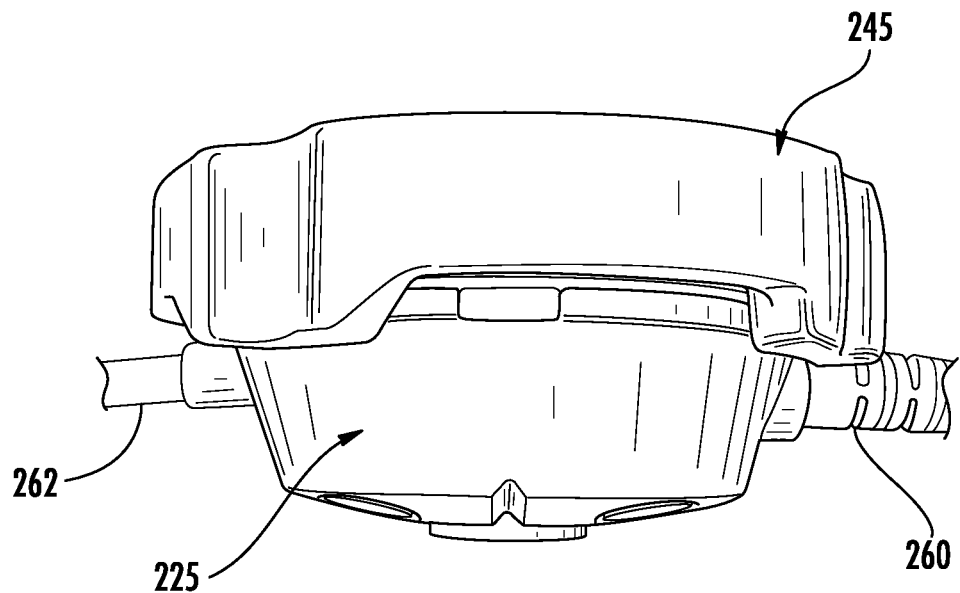
FIG. 31 is an enlarged side view of the sensor and the merchandise bracket of FIG. 29.

FIG. 28 shows an enlarged view of the merchandise bracket 145. The merchandise bracket 145 may include an adapter plate 165 that is secured to a base portion 166. The adapter plate 165 and base portion 166 may be secured together using any desired technique, such as with a fastener 168. The base portion 166 may define an outer surface that is configured to be secured to an article of merchandise M. As noted above, the merchandise bracket 145 may define at least one opening, including an opening 163 for receiving the sensor switch 130. In one embodiment, a pair of openings are defined, and one of the openings is configured to receive a portion 170 of the adapter plate 165 therein (see, e.g., FIG. 22). The portion 170 of the adapter plate 165 received within the base portion 166 may facilitate alignment therebetween as well as resisting rotation between the adapter plate and the base portion.

Figure 27:
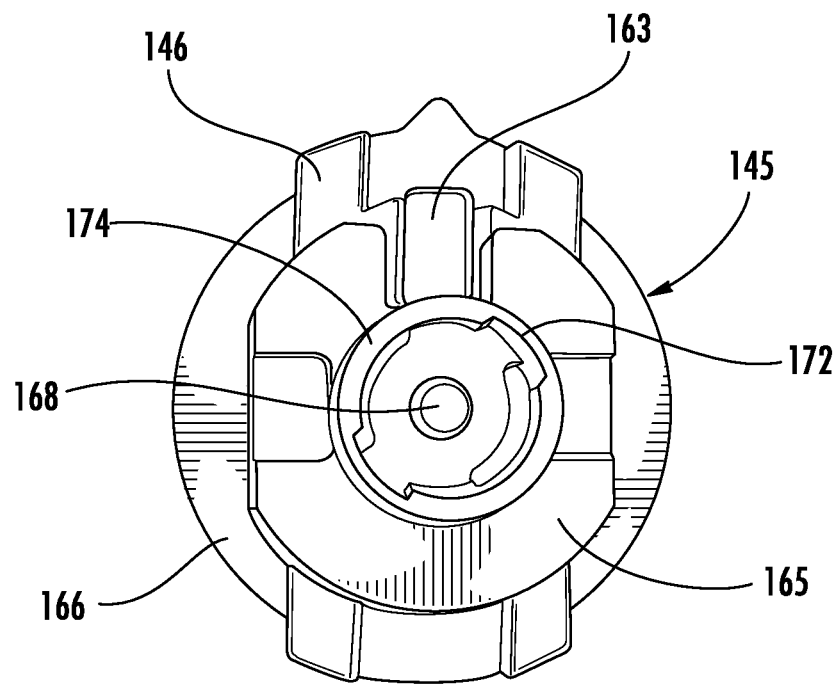
FIG. 27 is an enlarged plan view showing the merchandise bracket in greater detail.

In addition, FIG. 27 and FIG. 28 show that the adapter plate 165 may include one or more engagement features 172 that are configured to align with and engage the engagement features 167 of the rotatable quick-release mechanism 152. In this regard, the engagement features 172 may include a pair of radially opposite slots that are configured to align with the engagement features 167 of the rotatable quick-release mechanism 152. A lip 174 may be defined between the engagement features 172. In one embodiment, a medial portion of the adapter plate 165 may extend outwardly away from the base portion 166 to define a raised radial surface (see, e.g., FIG. 28). The lip 174 may extend radially about the circumference of the raised surface between the engagement features 172. The rotatable quick-release mechanism 152 is configured to be partially received within the raised surface such that the raised surface surrounds the engagement features 167. When the engagement features 167, 172 are aligned with one another, the engagement features 167 may be received by the engagement features 172, and rotation of the rotatable quick-release mechanism 152 causes the engagement features 167 to extend below and engage the lip 174. When the engagement features 167 engage the lip 174, the sensor 125 and merchandise bracket 145 are secured to one another and cannot be removed with an axial force. As such, rotation of the rotatable quick-release mechanism 152 in one direction may result in securing the sensor 125 and merchandise bracket 145 together, while rotation in an opposite direction may result in disengaging the sensor from the merchandise bracket. In some embodiments, the quick-release mechanism 152 may include a fastener, locking mechanism, or the like that is configured to lock the sensor 125 relative to the merchandise bracket 145 to prevent the sensor from rotating relative to the merchandise bracket.

FIGS. 29-35 illustrate another embodiment of a sensor 225 for a merchandise display security system and a merchandise bracket 245 implementing a quick-release feature 252 according to the invention. The sensor 225 may also be configured for use with the base 140 previously described. In this embodiment, the sensor 225 and merchandise bracket 245 are also configured to rotatably engage and disengage one another. As also previously discussed, the sensor 225 may include a cable 260 and a power cable 262. The merchandise bracket 245 may be configured to be attached to the article of merchandise M with a pressure-sensitive adhesive, although other securement techniques could be employed in other embodiments.

Figure 32:
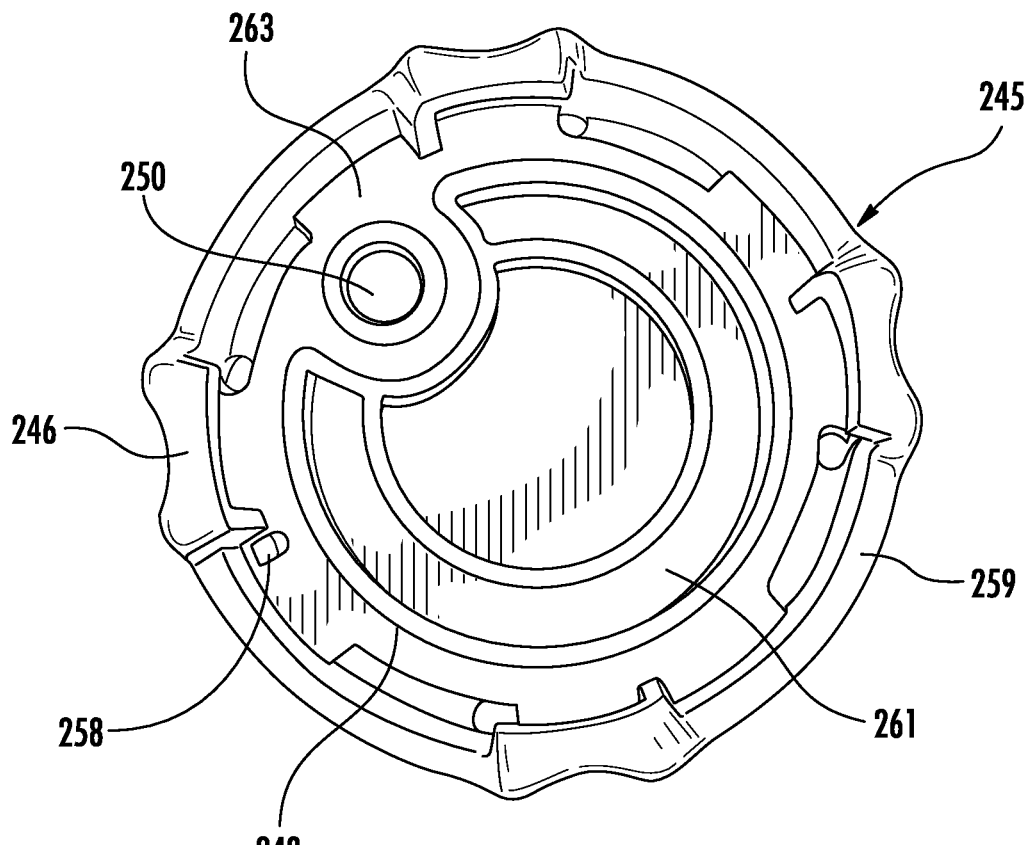
FIG. 32 is an enlarged plan view showing the merchandise bracket of FIG. 29 in greater detail.
Figure 33:
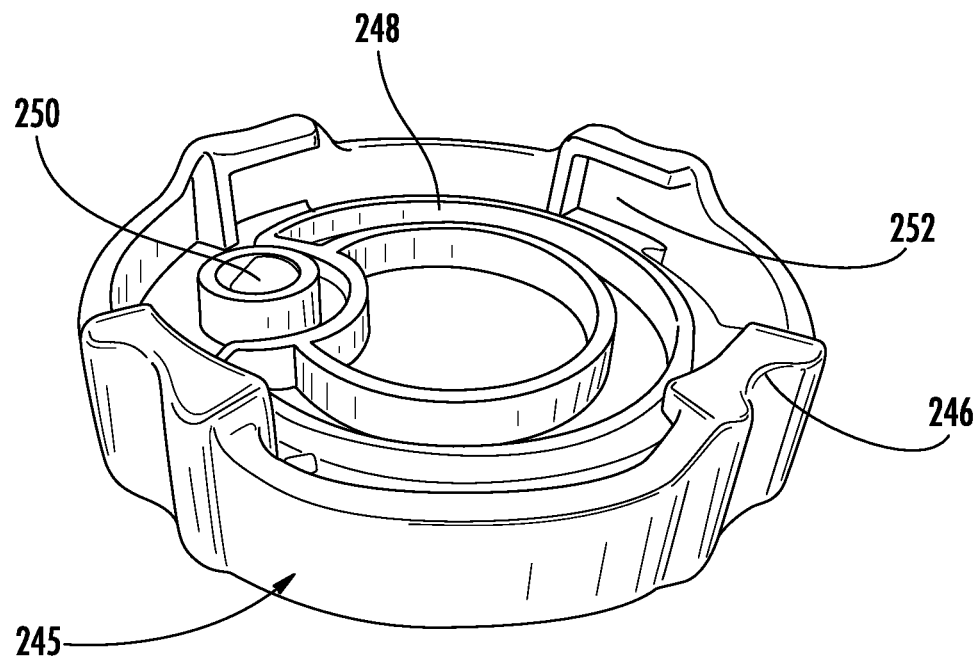
FIG. 33 is an enlarged perspective view showing the merchandise bracket of FIG. 29 in greater detail.

FIG. 32 and FIG. 33 show enlarged views of the merchandise bracket 245. As shown, the merchandise bracket 245 may include one or more engagement members 246. A plurality of engagement members 246 may be disposed about the outer perimeter of the merchandise bracket. By way of example only and not limitation, four engagement members 246 are shown in FIG. 32 and FIG. 33. In addition, the engagement members 246 may define slots 252 (FIG. 33), which may, for example, be L-shaped in configuration. Moreover, the merchandise bracket 245 may include a raised surface, or ridge 248 extending outwardly from an inner surface thereof. The raised surface may extend circumferentially on the inner surface. In one embodiment, the merchandise bracket 245 includes an outer portion 259 and an inner portion 261, wherein the inner portion is configured to rotate relative to the outer portion. The inner portion 261 may be configured to rotate in both a clockwise and counterclockwise direction, and may be configured to rotate at least partially about the inner circumference of the outer portion 259. The inner portion 261 may include the ridge 248, while the outer portion 259 may include the engagement members 246. The inner portion 261 may include one or more engagement features 263 that are configured to rotate relative to the engagement members 246 as well as engage the engagement members 246 to facilitate attachment between the inner portion 261 and the outer portion 259. In one example, the engagement features 263 are configured to rotate below the engagement members 246. Sufficient clearance is provided between the engagement features 263 and engagement members 246 to allow for rotation therebetween, but little if no axial movement relative to one another.

In one embodiment, the merchandise bracket 245 may include a sensor switch extender 250, which may also be provided on the inner portion 261 of the merchandise bracket. The sensor switch extender 250 may be movable relative to the merchandise bracket 245 and configured to align with a sensor switch 230 provided on the sensor 225. When the sensor 225 and merchandise bracket 245 are secured to one another, the sensor switch 230 is configured to bias the sensor switch extender 250 outwardly relative to merchandise bracket for contacting the article of merchandise M. Thus, in the event that the article of merchandise M is removed from the merchandise bracket 245 in an unauthorized manner, the sensor switch 230 will be activated via actuation of the sensor switch extender 250.

Figure 34:
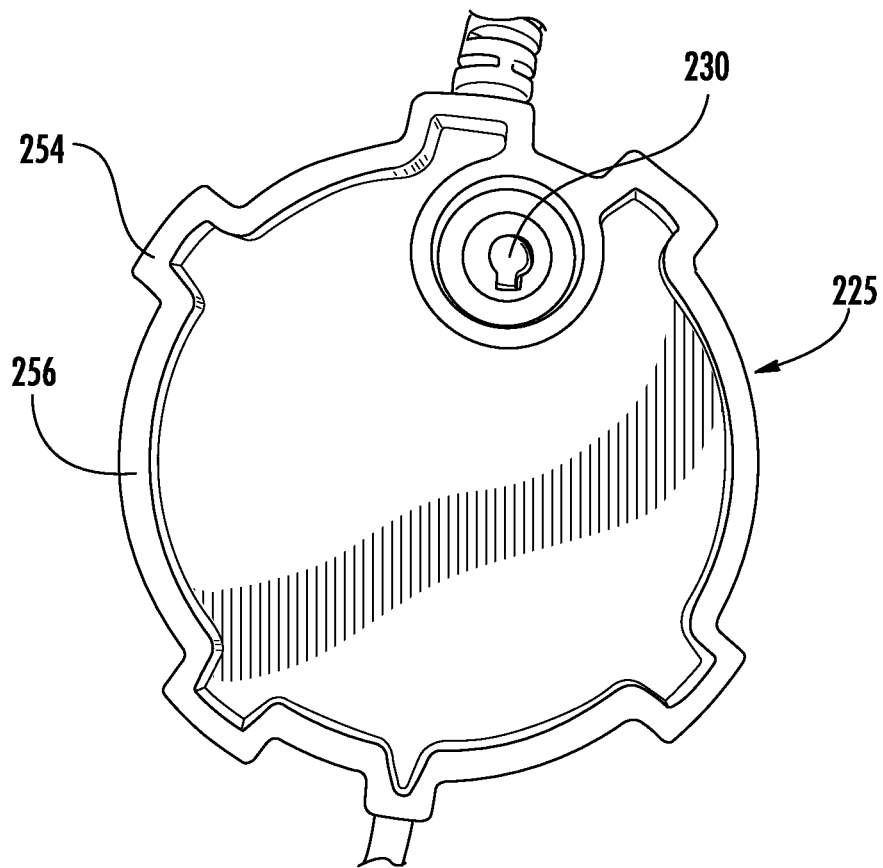
FIG. 34 is an enlarged plan view showing the sensor of FIG. 29 in greater detail.
Figure 35:
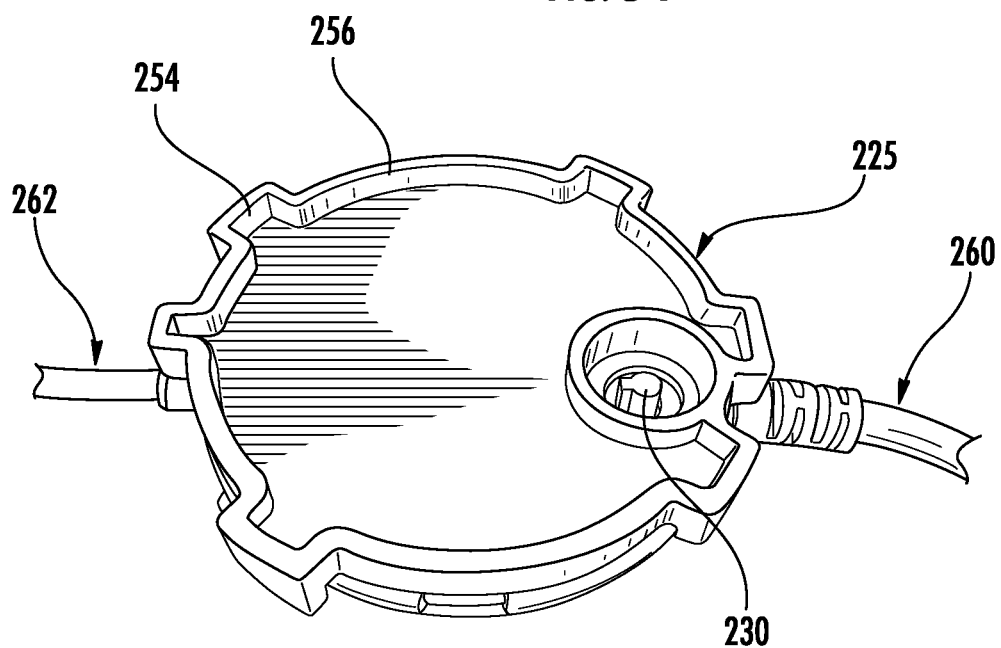
FIG. 35 is an enlarged perspective view showing the sensor of FIG. 29 in greater detail.
Figure 36:
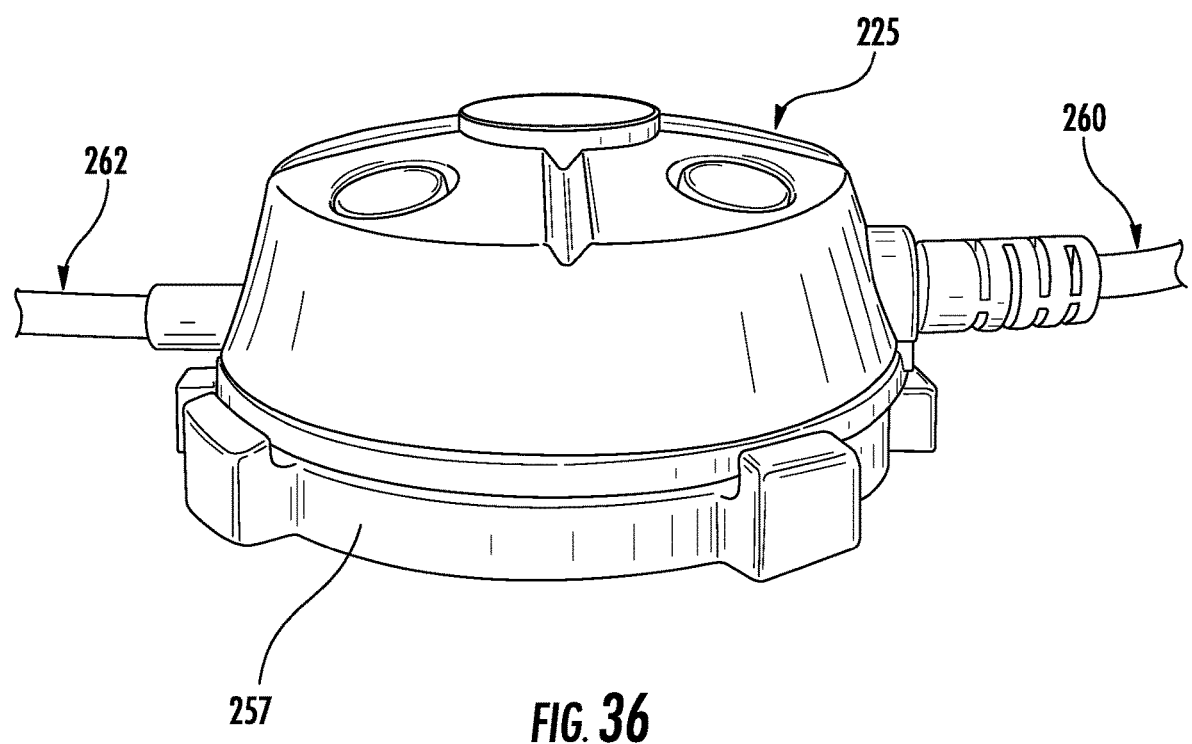
FIG. 36 is an enlarged perspective view of the sensor of FIG. 29 in greater detail.

FIGS. 34-36 illustrate enlarged views of the sensor 225 according to one embodiment of the invention. The sensor 225 includes at least one engagement member 254. As shown, the sensor 225 may include a plurality of engagement members 254 disposed about the outer perimeter of the sensor. The sensor 225 may also include a raised surface, or ridge 256 defined about the outer perimeter and between the engagement members 254. The engagement members 254 and ridge 256 may be defined on the sensor 225, or the sensor may include an adapter plate 257 secured to the sensor including such features (see, e.g., FIG. 36). The adapter plate 257 may be secured to the sensor 225 using any suitable technique, such as a pressure-sensitive adhesive and/or fasteners.

The sensor 225 is configured to be releasably secured to the merchandise bracket 245. In this regard, the sensor 225 is configured to be inserted into the merchandise bracket 245 such that the engagement features 254 are disposed adjacent to the outer perimeter of the merchandise bracket and the ridge 248 is disposed radially inwardly of the ridge 256. Thus, the merchandise bracket 245 is configured to receive at least a portion of the sensor 225 therein. The sensor 225 is also positioned adjacent to the inner portion 261 of the merchandise bracket 245. The sensor 225 is configured to be rotated relative to the merchandise bracket 245 to engage and disengage the merchandise bracket. For example, the sensor 225 may be configured to rotate in conjunction with the inner portion 261 in one direction (e.g., counterclockwise) so that the engagement members 254 engage engagement members 246. In particular, the engagement members 246 define slots 252 that are configured to receive the engagement members 254. The inner portion 261 and the sensor 225 may be configured to rotate in unison. When in engagement, the sensor 225 and merchandise bracket 245 are secured together and may not be removed from one another without disengaging the sensor from the merchandise bracket. The sensor 225 may be disengaged by rotating the sensor in an opposite direction (e.g., clockwise) relative to the merchandise bracket 245 until the engagement members 254, 246 disengage one another. The sensor 225 and/or merchandise bracket 245 may further include at least one blocking member 258 (FIG. 32) that is configured to only allow rotation of the sensor 225 in one direction. In other words, when the engagement members 254, 246 are not in engagement with one another, the blocking member 258 is configured to abut an engagement member 254 when rotated in a direction that does not result in engagement with an engagement member 246.

Therefore, in light of the aforementioned discussion, it is apparent that various techniques may be employed for securing a sensor to a merchandise bracket and for quickly releasing the sensor from the merchandise bracket. The quick-release feature does not require disconnecting cables or disassembly of the sensor in order to separate the sensor from the article of merchandise. In addition, the quick-release feature may facilitate changing batteries in the article of merchandise, storing the article of merchandise when not in use, or servicing the article of merchandise.

Embodiments of a merchandise display security system including at least the aforementioned features have been shown and described herein for purposes of illustrating and enabling the best mode of the invention. Those of ordinary skill in the art, however, will readily understand and appreciate that numerous variations and modifications of the invention may be made without departing from the spirit and scope of the invention. Accordingly, all such variations and modifications are intended to be encompassed by the appended claims.

That which is claimed is:

1. A merchandise display security system for displaying and protecting an article of merchandise, the merchandise display security system comprising:
  a merchandise bracket configured to be secured in direct contact with the article of merchandise via an adhesive, a fastener, or both an adhesive and a fastener; and
  a housing containing electronics configured to releasably engage the merchandise bracket, wherein the housing is configured to be releasably engaged with the merchandise bracket such that the housing is entirely removable from the merchandise bracket while the merchandise bracket remains secured to the article of merchandise,
  wherein the merchandise bracket is positioned at least partially between the housing and the article of merchandise when the merchandise bracket is secured to the article of merchandise, wherein the housing and the merchandise bracket each comprises a plurality of engagement members that are configured to align with and engage one another for securing the housing and the merchandise bracket to one another,
  wherein the housing comprises a top surface and a bottom surface, and wherein the plurality of engagement members of the housing are defined on the top surface, and
  wherein the merchandise bracket comprises a top surface and a bottom surface, wherein the top surface of the merchandise bracket is configured to be secured to the article of merchandise, and wherein the plurality of engagement members of the merchandise bracket are defined on the bottom surface of the merchandise bracket and configured to engage the plurality of engagement members of the housing.

2. The merchandise display security system of claim 1, wherein the housing is configured to be rotated relative to the merchandise bracket for engaging and disengaging the merchandise bracket from the housing.

3. The merchandise display security system of claim 1, wherein the housing comprises a rotatable quick-release mechanism such that rotation of the rotatable quick-release mechanism is configured to engage and disengage the merchandise bracket from the housing.

4. The merchandise display security system of claim 1, wherein the housing is configured to slide relative to the merchandise bracket for engaging and disengaging the merchandise bracket.

5. The merchandise display security system of claim 1, further comprising a cable connected to the housing and a base configured to removably support the housing thereon, wherein the housing and cable are configured to be removed from the merchandise display bracket while the merchandise bracket remains secured to the article of merchandise, and wherein the cable is coupled to the base such that the housing is tethered relative to the base.

6. The merchandise display security system of claim 5, wherein the base comprises electronics configured to detect when the housing is removed from the merchandise bracket in an unauthorized manner.

7. The merchandise display security system of claim 5, wherein the base comprises electronics configured to electrically connect to the electronics contained within the sensor.

8. The merchandise display security system of claim 1, wherein the housing is configured to be locked to the merchandise bracket when in engagement with one another such that removal of the housing from the merchandise bracket requires a key.

9. The merchandise display security system according to claim 1, wherein the housing comprises a quick-release mechanism configured to release the housing from the merchandise bracket.

10. The merchandise display security system according to claim 9, wherein the quick-release mechanism is configured to disengage the housing from the merchandise bracket without disassembling the housing and without removing one or more fasteners from the housing.

11. The merchandise display security system according to claim 9, wherein the quick-release mechanism is configured to be engaged by a key to release the housing from the merchandise bracket.

12. The merchandise display security system according to claim 9, wherein the quick-release mechanism is spring biased and is configured to engage and disengage the merchandise bracket.

13. The merchandise display security system according to claim 1, wherein the housing defines an opening configured to receive the merchandise bracket therein such that the merchandise bracket is at least partially housed within the housing.

14. The merchandise display security system of claim 1, wherein the plurality of engagement members of the housing are protrusions and the plurality of engagement members of the merchandise bracket are slots, and wherein the protrusions of the housing are configured to engage with and disengage from the slots of the merchandise bracket.

15. The merchandise display security system of claim 14, wherein the housing is configured to be rotated relative to the merchandise bracket for causing the protrusions to engage or disengage the slots.

16. The merchandise display security system of claim 1, wherein the plurality of engagement members of the housing are slots and the plurality of engagement members of the merchandise bracket are protrusions, and wherein the protrusions of the merchandise bracket are configured to engage with and disengage from the slots of the housing.

17. The merchandise display security system of claim 16, wherein the housing is configured to be rotated relative to the merchandise bracket for causing the protrusions to engage or disengage the slots.

18. The merchandise display security system of claim 17, wherein the plurality of slots are spaced circumferentially relative to one another, and wherein the plurality of protrusions are spaced circumferentially relative to one another.

19. The merchandise display security system of claim 1, further comprising a key configured to disengage the housing from the merchandise bracket.

20. A method for displaying and protecting an article of merchandise, the method comprising:
   securing a merchandise bracket in direct contact with the article of merchandise via an adhesive, a fastener, or both an adhesive and a fastener; and
   releasably engaging a housing containing electronics to the merchandise bracket,
   wherein the housing is configured to be releasably engaged with the merchandise bracket such that the housing is entirely removable from the merchandise bracket while the merchandise bracket remains secured to the article of merchandise,
   wherein the merchandise bracket is positioned at least partially between the housing and the article of merchandise when the merchandise bracket is secured to the article of merchandise,
   wherein the housing and the merchandise bracket each comprises a plurality of engagement members that are configured to align with and engage one another for securing the housing and the merchandise bracket to one another,
   wherein the housing comprises a top surface and a bottom surface, and wherein the plurality of engagement members of the housing are defined on the top surface, and
   wherein the merchandise bracket comprises a top surface and a bottom surface, wherein the top surface of the merchandise bracket is configured to be secured to the article of merchandise, and wherein the plurality of engagement members of the merchandise bracket are defined on the bottom surface of the merchandise bracket and configured to engage the plurality of engagement members of the housing.

\* \* \* \* \*